United States Patent
Yamada et al.

(10) Patent No.: US 7,974,441 B2
(45) Date of Patent: Jul. 5, 2011

(54) OBJECT DETECTION APPARATUS FOR DETECTING A SPECIFIC OBJECT IN AN INPUT IMAGE

(75) Inventors: Akihiko Yamada, Moriguchi (JP); Hitoshi Hongo, Moriguchi (JP); Yohei Ishii, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 990 days.

(21) Appl. No.: 11/710,559

(22) Filed: Feb. 26, 2007

(65) Prior Publication Data

US 2007/0201747 A1 Aug. 30, 2007

(30) Foreign Application Priority Data

Feb. 28, 2006 (JP) .................. 2006-053304
Dec. 28, 2006 (JP) .................. 2006-354005

(51) Int. Cl.
*G06K 9/00* (2006.01)
(52) U.S. Cl. .................. 382/103; 382/118
(58) Field of Classification Search .................. 382/103
See application file for complete search history.

(56) References Cited

U.S. PATENT DOCUMENTS

| | | | | |
|---|---|---|---|---|
| 5,870,502 | A * | 2/1999 | Bonneau et al. | 382/249 |
| 6,421,463 | B1 * | 7/2002 | Poggio et al. | 382/224 |
| 6,453,069 | B1 * | 9/2002 | Matsugu et al. | 382/173 |
| 6,711,279 | B1 * | 3/2004 | Hamza et al. | 382/103 |
| 2002/0102024 | A1 * | 8/2002 | Jones et al. | 382/225 |
| 2004/0228505 | A1 * | 11/2004 | Sugimoto | 382/118 |
| 2005/0280809 | A1 * | 12/2005 | Hidai et al. | 356/237.3 |

FOREIGN PATENT DOCUMENTS

| | | |
|---|---|---|
| JP | 08249466 | 9/1996 |
| JP | 2000-134638 | 5/2000 |
| JP | 2000134638 | 5/2000 |
| JP | 2002304627 | 10/2002 |
| JP | 2004334836 | 11/2004 |
| JP | 2005025568 | 1/2005 |
| JP | 2005056124 | 3/2005 |
| JP | 2005157679 | 6/2005 |
| JP | 2005235089 | 9/2005 |

OTHER PUBLICATIONS

Notice of Rejection from corresponding case, dated Dec. 24, 2009.
Notice of Rejection from Corresponding Japanese Application No. 2006-354005; dated Mar. 18, 2010.
Masao Shimizu; Digital Image Processing; Jul. 22, 2004; pp. 203-204 (Chapter 12-1-2: Similarity Measure); Computer Graphic Arts Society (CG-ARTS Society); Tokyo, Japan.

* cited by examiner

*Primary Examiner* — David P Rashid
(74) *Attorney, Agent, or Firm* — NDQ&M Watchstone LLP

(57) ABSTRACT

An object detection apparatus for detecting a specific object in an input image includes a specific object detection module for performing a specific object detecting process of setting the input image or a reduced image of the input image as a target image, and of determining whether or not the specific object exists in a determination region while scanning the determination region in an edge feature image of the target image. The specific object detection module includes a determination module for determining whether the specific object exists in the determination region, based on an edge feature amount of the edge feature image corresponding to the determination region, and a previously determined relationship between an edge feature amount and a weight indicating object likelihood for each predetermined feature pixel in an image having the same size as the determination region.

9 Claims, 32 Drawing Sheets

FIG. 5A

| 1 | 0 | -1 |
|---|---|---|
| 1 | 0 | -1 |
| 1 | 0 | -1 |

HORIZONTAL DIRECTION

FIG. 5B

| 1 | 1 | 1 |
|---|---|---|
| 0 | 0 | 0 |
| -1 | -1 | -1 |

VERTICAL DIRECTION

FIG. 5C

| 1 | 1 | 0 |
|---|---|---|
| 1 | 0 | -1 |
| 0 | -1 | -1 |

OBLIQUELY UPPER RIGHT DIRECTION

FIG. 5D

| 0 | 1 | 1 |
|---|---|---|
| -1 | 0 | 1 |
| -1 | -1 | 0 |

OBLIQUELY UPPER LEFT DIRECTION

EDGE FEATURE IMAGE IN HORIZONTAL DIRECTION

EDGE FEATURE IMAGE IN VERTICAL DIRECTION

EDGE FEATURE IMAGE IN OBLIQUELY UPPER RIGHT DIRECTION

EDGE FEATURE IMAGE IN OBLIQUELY UPPER LEFT DIRECTION

FIG. 8

PIXEL VALUE

| qyx | 0 | 1 | 2 | 3 | 4 | 5 | 6 | 7 | 8 | 9 | 10 | ... | ... | M-1 | M |
|---|---|---|---|---|---|---|---|---|---|---|---|---|---|---|---|
| 000 | 10 | -10 | 1 | 35 | 29 | -17 | ... | | | | | | | | |
| 001 | 1 | -10 | -8 | 5 | 9 | -7 | ... | | | | | | | | |
| 002 | 98 | -25 | 3 | 7 | 21 | -80 | ... | | | | | | | | |
| 003 | : | : | : | : | : | : | : | : | | | ... | | | | |
| 004 | : | : | : | : | : | : | : | : | | | ... | | | | |
| 005 | | | | | | | | | | | | | | | |
| 006 | | | | | | | | | | | | | | | |
| 007 | | | | | | | | | | | | | | | |
| 100 | | | | | | | | | | | | | | | |
| 101 | | | | | | | | | | | | | | | |
| ⋮ | | | | | | | | | | | | | | | |
| 305 | : | : | : | : | : | : | : | : | | | ... | | | | |
| 306 | : | : | : | : | : | : | : | : | | | ... | | | | |
| 307 | | | | | | | | | | | | | | | |
| 010 | | | | | | | | | | | | | | | |
| 011 | | | | | | | | | | | | | | | |

FEATURE PIXEL POSITION

FIG. 13

| qxy | $a_0$ | $a_1$ | $a_2$ | $a_3$ |
|-----|-----|-----|-----|-----|
| 000 | 10 | -100 | 1 | 35 |
| 001 | 1 | -10 | -8 | 5 |
| 002 | 98 | -25 | 3 | 7 |
| 003 | ... | ... | ... | ... |
| 004 | | | | |
| 005 | | | | |
| 006 | | | | |
| 007 | | | | |
| 305 | 15 | -2 | -3 | 4 |
| 306 | 40 | -20 | 1 | 5 |
| 307 | 42 | -7 | -12 | 3 |
| 010 | | | | |
| 011 | | | | |

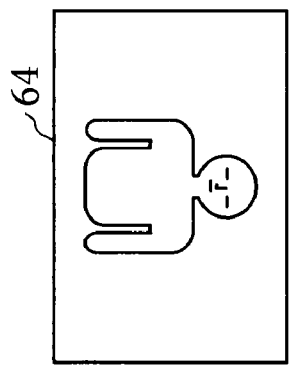
FIG. 19A  0°
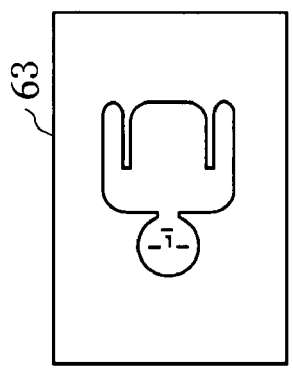
FIG. 19B  90°
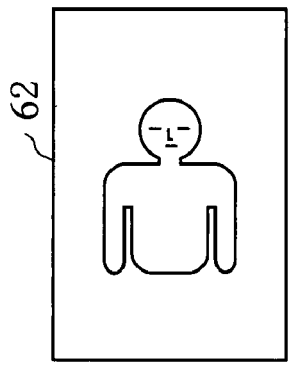
FIG. 19C  -90°
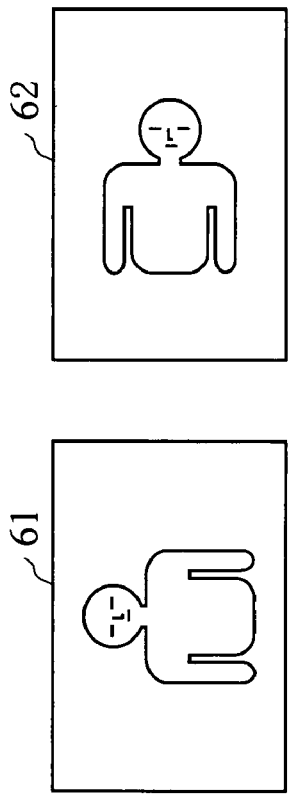
FIG. 19D  180°

FIG. 24
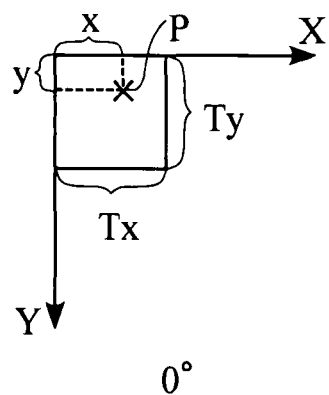
0°
$$\begin{cases} X = x \\ Y = y \end{cases}$$
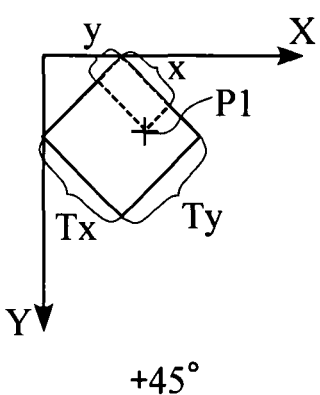
+45°
$$\begin{cases} X = (Ty + x - y)/\sqrt{2} \\ Y = (x + y)/\sqrt{2} \end{cases}$$
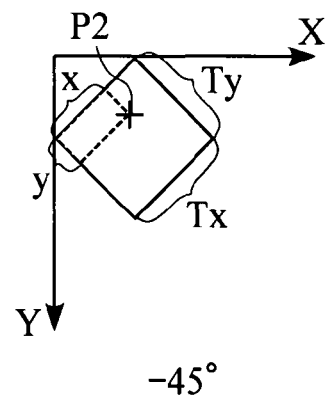
−45°
$$\begin{cases} X = (x + y)/\sqrt{2} \\ Y = (Ty - x + y)/\sqrt{2} \end{cases}$$
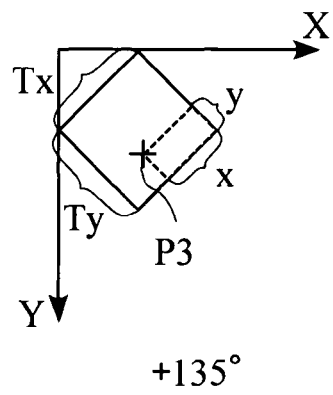
+135°
$$\begin{cases} X = (Ty + Tx - x - y)/\sqrt{2} \\ Y = (Tx + x - y)/\sqrt{2} \end{cases}$$
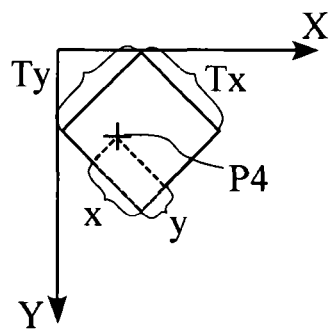
−135°
$$\begin{cases} X = (Ty - x + y)/\sqrt{2} \\ Y = (Ty + Tx - x - y)/\sqrt{2} \end{cases}$$

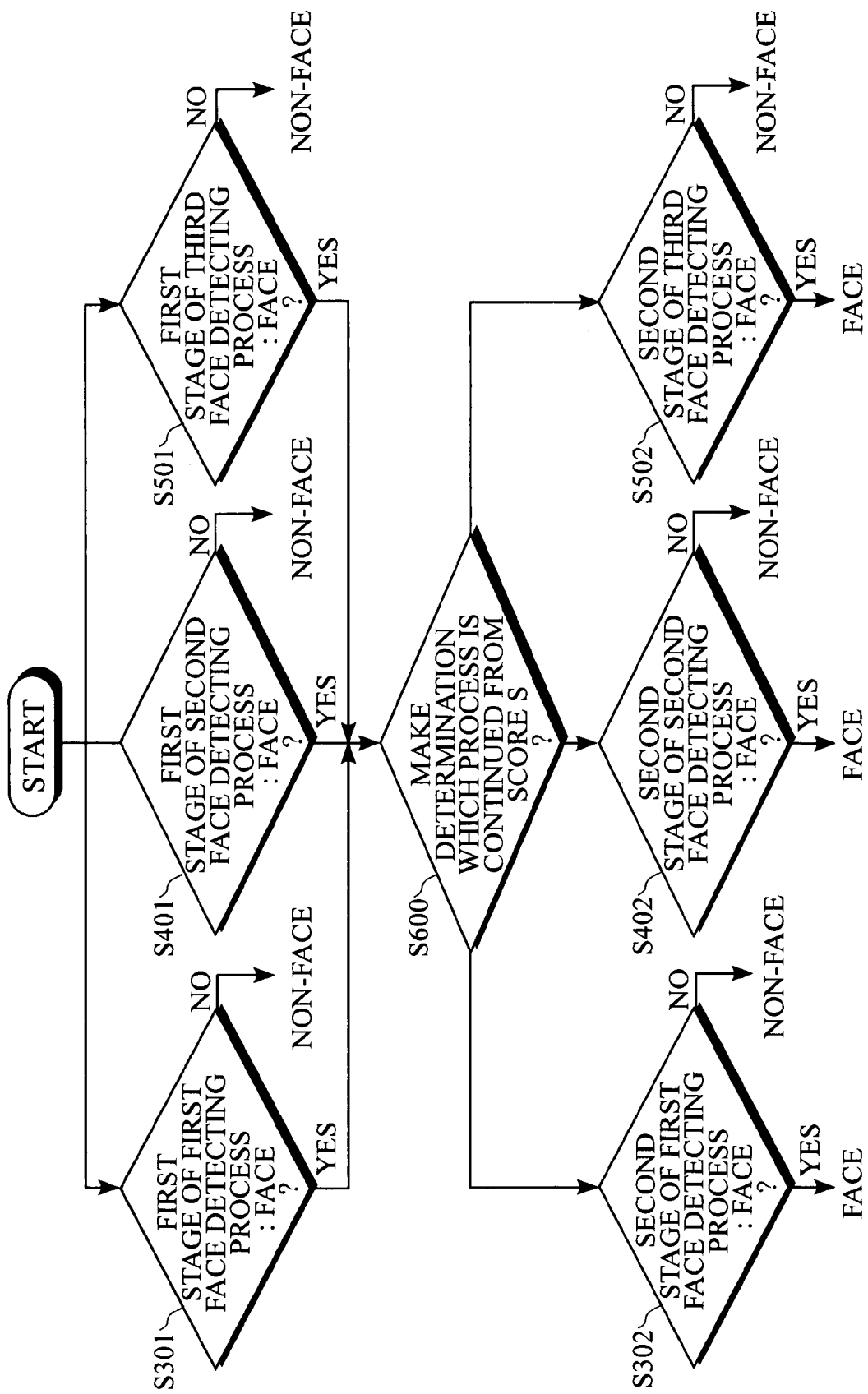

OBJECT DETECTION APPARATUS FOR DETECTING A SPECIFIC OBJECT IN AN INPUT IMAGE

BACKGROUND OF THE INVENTION

1. Field of the Invention

The present invention relates to an object detection apparatus which is used to detect a specific object such as a face in an input image.

2. Description of the Related Art

Conventionally, examples of a method of detecting the specific object such as the face from the input image include a method of applying template matching to reduced images which are hierarchically produced to the input image (PP. 203, Digital Image Processing, CG-ARTS Society) and a method of converting the input image into an image called integral image to integrate a weight corresponding to a size of rectangular feature amount (U.S. Patent Application No. 2002/0102024 A1). A method of narrowing down object candidates of the hierarchical image with motion information or color information is proposed as a method of reducing a processing time (see Japanese Patent Laid-Open No. 2000-134638).

In the conventional techniques, a determination whether or not the specific object exists in a determination region is made while the determination region is slightly moved on the input image. In the method of applying the template matching, a correlation and a differential sum of squares are frequently used in the matching, and it takes a long time to perform the computation. In the method in which the integral image is used, it has been confirmed that the method is operated at relatively high speed on a personal computer. However, a large memory resource is required to perform the conversion into the integral image and the computation of the rectangular feature amount, and a large load also applied to CPU. Therefore, the method in which the integral image is used is not suitable to implementation on a device.

The method of narrowing down the object candidates with the motion information or color information is hardly applied when the specific object is not moved. Additionally, because the color information heavily depends on the light source color and the like, it is difficult to make the stable detection.

SUMMARY OF THE INVENTION

In view of the foregoing, an object of the invention is to provide an object detection apparatus which can perform the high-speed processing with higher accuracy while decreasing the memory resource and the load to CPU.

An object detection apparatus according to a first aspect of the invention which detects a specific object in an input image, including specific object detection means for performing a specific object detecting process of setting the input image or a reduced image of the input image as a target image, and of determining whether or not the specific object exists in a determination region while scanning the determination region in the target image or an edge feature image of the target image, wherein the specific object detection means includes determination means for determining whether or not the specific object exists in the determination region, based on an edge feature amount of the edge feature image corresponding to the determination region, and a previously determined relationship between an edge feature amount and a weight indicating object likelihood for each predetermined feature pixel in an image having the same size as the determination region.

An object detection apparatus according to a second aspect of the invention which detects a specific object in an input image, including: reduced-image generating means for generating one or a plurality of reduced images from the input image; and specific object detection means for performing a specific object detecting process of setting each of a plurality of hierarchical images as a target image, and of determining whether or not the specific object exists in a determination region while scanning the determination region in the target image or an edge feature image of the target image, the plurality of hierarchical images including the input image and one or a plurality of reduced images of the input image, wherein the specific object detection means includes determination means for determining whether or not the specific object exists in the determination region, based on an edge feature amount of the edge feature image corresponding to the determination region, and a previously determined relationship between an edge feature amount and a weight indicating object likelihood for each predetermined feature pixel in an image having the same size as the determination region.

In the object detection apparatus according to the first or second aspect of the invention, preferably the specific object detection means includes a specific object detecting table, which is previously prepared from a plurality of sample images including the specific object and stores the previously determined relationship between an edge feature amount and a weight indicating object likelihood for each predetermined feature pixel in the image having the same size as the determination region; and the determination means determines whether or not the specific object exists in the determination region based on an edge feature amount of the edge feature image corresponding to the determination region and the specific object detecting table.

In the object detection apparatus according to the first or second aspect of the invention, preferably the determination means includes plural determination processing means having the different numbers of feature pixels which are used in determination for the determination region at any position, a determination process is performed in the order from the determination processing means having the smaller number of feature pixels used in the determination, and, when any determination processing means determines that the specific object does not exist, a subsequent process performed by the determination processing means is aborted.

In the object detection apparatus according to the first or second aspect of the invention, preferably the edge feature image is plural kinds of edge feature images having different edge directions.

In the object detection apparatus according to the first or second aspect of the invention, preferably the specific object detection means performs the specific object detecting process using a determination region having a single size and one kind of the specific object detecting table corresponding to the size of the determination region.

In the object detection apparatus according to the first or second aspect of the invention, preferably the specific object detection means prepares plural kinds of the determination regions having the different sizes, the specific object detection means holds the plural specific object detecting tables according to the plural kinds of the determination regions, the specific object detection means sets the plural kinds of the determination regions in the target image or the edge feature image of the target image, and the specific object detection means performs the specific object detecting process in each set determination region using the specific object detecting table corresponding to the determination region.

In the object detection apparatus according to the second aspect of the invention, preferably the specific object detection means prepares the determination region having the different size in each hierarchical target image, the specific object detection means holds the plurality of specific object detecting tables according to the determination regions, the specific object detection means performs a specific object roughly-detecting process to a lower hierarchical target image or the edge feature image of the lower hierarchical target image using the determination region corresponding to the lower hierarchy and the specific object detecting table corresponding to the determination region of the lower hierarchy when the specific object detection means performs the specific object detecting process to an arbitrary hierarchy, and the specific object detection means performs the specific object detecting process to the hierarchical target image or the edge feature image of the hierarchical target image using the determination region corresponding to the arbitrary hierarchy and the specific object detecting table corresponding to the determination region of the arbitrary hierarchy when a face is detected in the specific object roughly-detecting process.

In the object detection apparatus according to the first or second aspect of the invention, preferably the specific object detection means prepares plural kinds of the determination regions having the different sizes, the specific object detection means holds the plural specific object detecting tables according to the plural kinds of the determination regions and a specific object roughly-detecting table for detecting faces having all the sizes, the face being able to be detected by each determination region, the specific object detection means sets a common determination region including all the kinds of the determination regions in the target image or the edge feature image of the target image, the specific object detection means performs the specific object roughly-detecting process using the specific object roughly-detecting table, and the specific object detection means sets the plural kinds of the determination regions in the target image or the edge feature image of the target image and performs the specific object detecting process in each set determination region using the specific object detecting table corresponding to the determination region when a face is detected in the specific object roughly-detecting process.

In the object detection apparatus according to the first or second aspect of the invention, preferably the edge feature image is an edge feature image corresponding to each of the four directions of a horizontal direction, a vertical direction, an obliquely upper right direction, and an obliquely upper left direction, the feature pixel of the specific object detecting table is expressed by an edge number indicating an edge direction and an xy coordinate, a position in which the edge number of the feature pixel and/or the xy coordinate is converted by a predetermined rule is used as a position on the edge feature image corresponding to any feature pixel of the specific object detecting table, and the specific object which is rotated by a predetermined angle with respect to a default rotation angle position of the specific object can be detected by the post-conversion position.

In the object detection apparatus according to the first or second aspect of the invention, preferably the edge feature image is an edge feature image corresponding to each of the four directions of a horizontal direction, a vertical direction, an obliquely upper right direction, and an obliquely upper left direction, the feature pixel of the specific object detecting table is expressed by an edge number indicating an edge direction and an xy coordinate, a position in which the edge number of the feature pixel and/or the xy coordinate is converted by a predetermined rule is used as a position on the edge feature image corresponding to any feature pixel of the specific object detecting table, and the specific object in which a default attitude is horizontally flipped or the specific object in which a default attitude is vertically flipped can be detected by the post-conversion position.

In the object detection apparatus according to the first or second aspect of the invention, preferably weights indicating the object likelihood are stored in the specific object detecting table for each predetermined feature pixel of the image having the same size as the determination region, the weights corresponding to the respective edge feature amounts which are possibly taken in the feature pixel.

In the object detection apparatus according to the first or second aspect of the invention, preferably coefficients of a polynomial are stored in the specific object detecting table for each predetermined feature pixel of the image having the same size as the determination region, the polynomial representing the edge feature amounts possibly taken in the feature pixel and the weights indicating the object likelihood.

BRIEF DESCRIPTION OF THE DRAWINGS

FIGS. 5A to 5D are a schematic view showing an example of a differentiation filter corresponding to each of four directions of a horizontal edge, a vertical edge, an obliquely upper right edge, and an obliquely upper left edge;

FIG. 8 is a schematic view showing an example of contents of a weighting table;

FIG. 13 is a schematic view showing an example of contents of a coefficient table;

FIGS. 19A to 19D are schematic views showing examples of the input images in the case where a rotation angle of a detection-target face is changed;

FIG. 24 is a schematic view showing a relationship between the coordinate of the feature point assigned by the weighting table and the xy coordinate of the feature points corresponding to +45°, −45°, +135°, and −135° face images (edge feature images);

FIG. 34 is a flowchart showing the procedure of the face detecting process.

DESCRIPTION OF THE PREFERRED EMBODIMENTS

A face detection apparatus according to a preferred embodiment of the invention will be described below with reference to the drawings.

First Embodiment

(1) Configuration of Face Detection Apparatus

Figure 1:
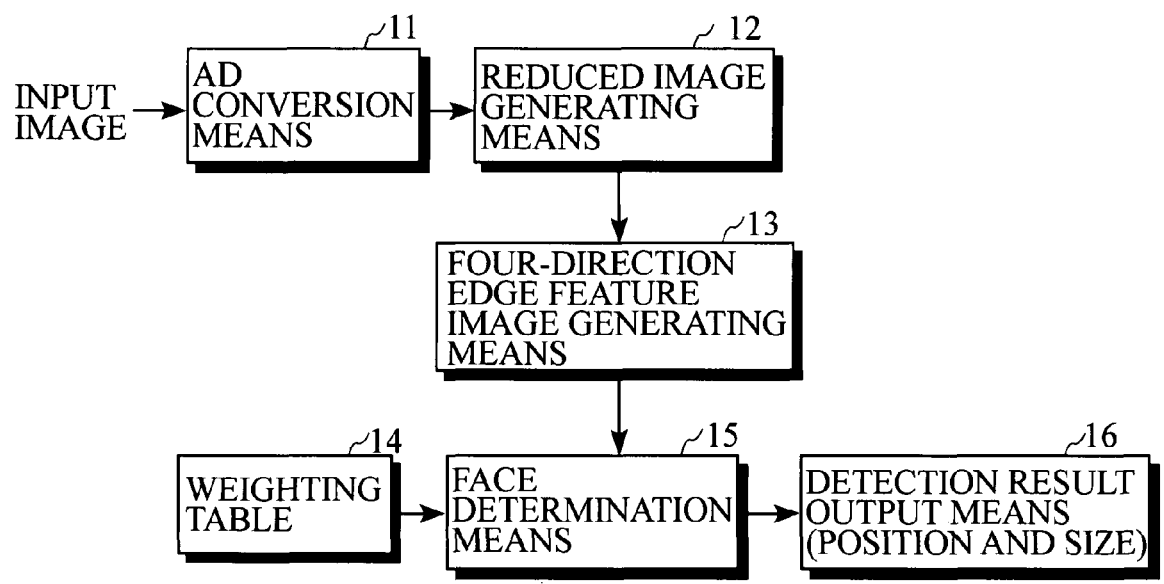
FIG. 1 is a block diagram showing a configuration of a face detection apparatus.

FIG. 1 shows a configuration of a face detection apparatus according to a first embodiment of the invention.

The face detection apparatus of the first embodiment includes AD conversion means 11, reduced image generating means 12, four-direction edge feature image generating means 13, a memory 14, face determination means 15, and detection result output means 16. The AD conversion means 11 converts input image signal into digital data. The reduced image generating means 12 generates one or plural reduced images based on the image data obtained by the AD conversion means 11. The four-direction edge feature image generating means 13 generates an edge feature image of each of four directions in each hierarchical image which is formed by an input image and a reduced image. A face detecting weighting table obtained from a large amount of teacher samples (face sample images and non-face sample images) is stored in the memory 14. The face determination means 15 determines whether or not the face exists in the input image using the weighting table and the edge feature image in each of the four directions generated by the four-direction edge feature image generating means 13. The detection result output means 16 outputs the detection result of the face determination means 15. When the face is detected, the detection result output means 16 outputs a size and position of the face based on the input image.

(2) Operation of Face Detection Apparatus

Figure 2:
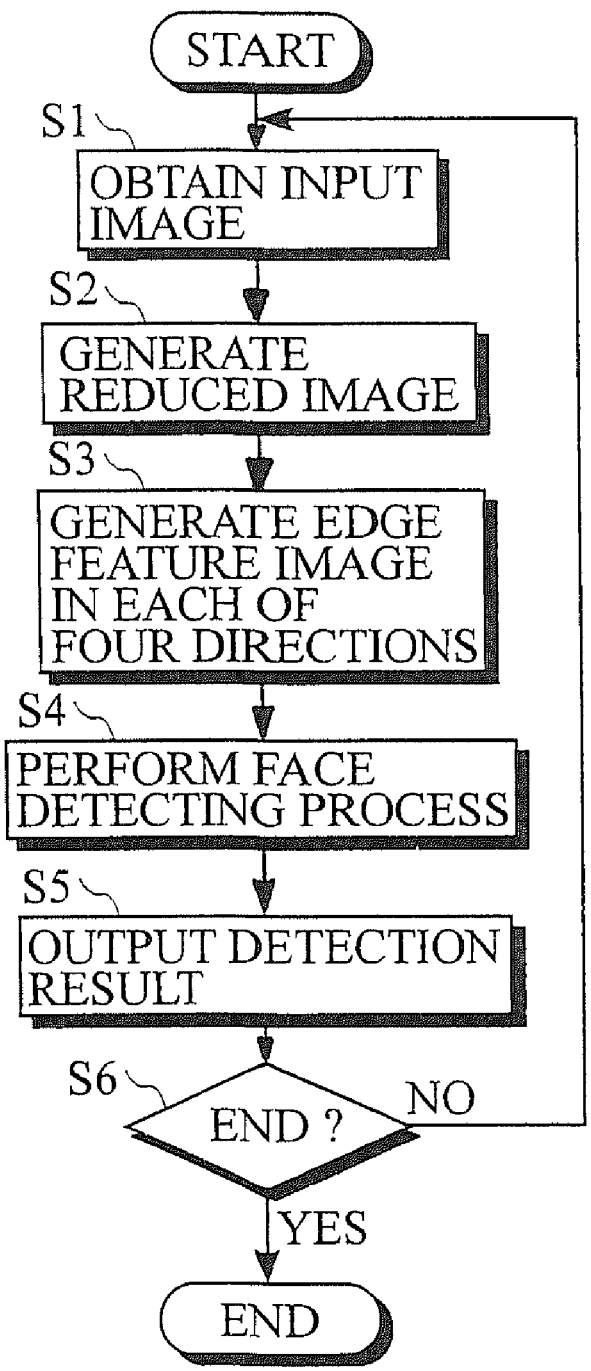
FIG. 2 is a flowchart showing an operation of the face detection apparatus.

FIG. 2 shows an operation of the face detection apparatus.

First the input image is obtained (Step S1), and one or plural reduced images are generated from the input image using a predetermined reduction ratio (Step S2). The edge feature image is generated in each of the four directions in each hierarchical image which is formed by the input image and the reduced image (Step S3). A face detecting process is performed using each edge feature image and the weighting table (Step S4), and the detection result is delivered (Step S5). When a command for ending the face detection is not inputted (Step S6), the flow returns to Step S1. When the command for ending the face detection is inputted in Step S6, the flow is ended.

(3) Hierarchical Image

Figure 3:
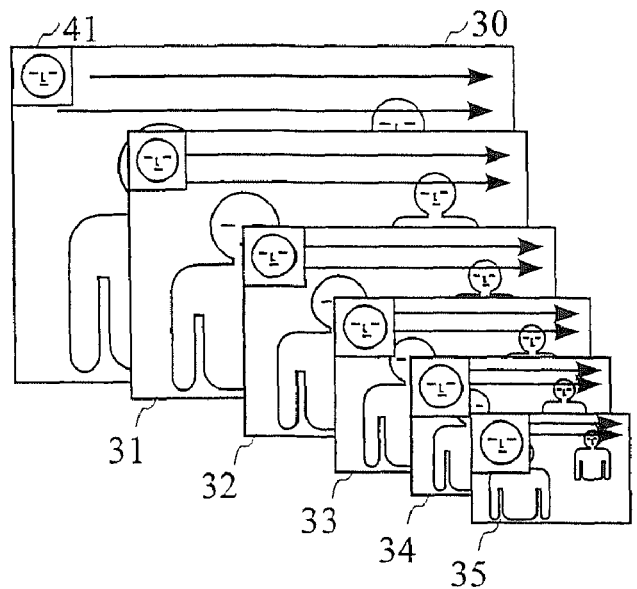
FIG. 3 is a schematic view showing plural hierarchical images obtained through Step S2 of FIG. 2.

FIG. 3 shows an example of hierarchical images obtained through Step S2 of FIG. 2.

In the example of FIG. 3, the plural hierarchical images are generated in the case where a reduction ratio R is set to 0.8. In FIG. 3, the numeral 30 designates the input image and the numerals 31 to 35 designate the reduced images. The numeral 41 designates a determination region. In the example, a size of the determination region is set to a 24 by 24 matrix. The determination region has the same size in both the input image and each reduced image. As shown by arrows of FIG. 3, an operation of vertically scanning the determination region from the left to the right and from an upper portion toward a lower portion. However, the scanning procedure is not limited to that of FIG. 3. The reason why the plural reduced images are generated in addition to the input image is that the faces having different sizes are detected using the one kind of weighting table.

(4) Method of Generating Four-Direction Edge Feature Image in Step S3 of FIG. 2

Figure 4:
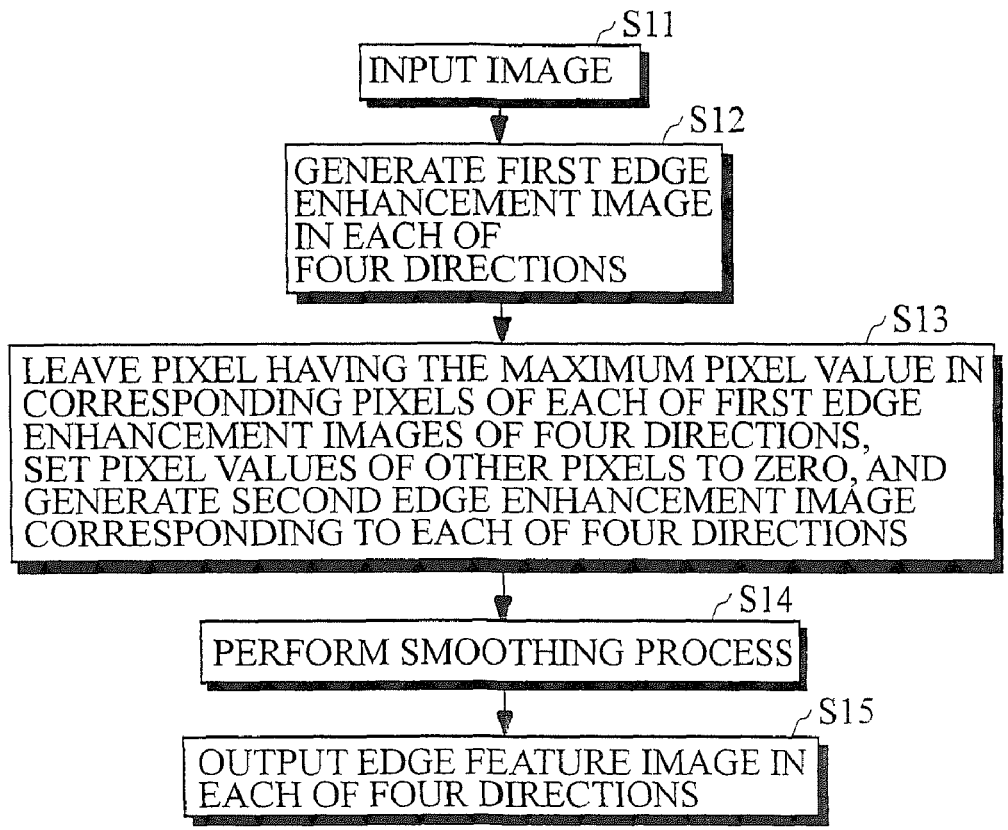
FIG. 4 is a flowchart showing a procedure of a process of generating four-direction edge feature images performed in Step S3 of FIG. 2.

FIG. 4 shows a procedure of a process of generating the edge feature image in each of the four directions, which is performed in Step S3 of FIG. 2.

The hierarchical image to be processed is inputted (Step S11). An edge enhancement process is performed to the inputted hierarchical image to respectively generate the first edge enhancement images corresponding to the four directions using a Prewitt type differentiation filter which corresponds to each of the four directions of a horizontal direction, a vertical direction, an obliquely upper right direction, and an obliquely upper left direction as shown in FIGS. 5A to 5D (Step S12). Then, the pixel having the maximum pixel value is left in the corresponding pixels of each of the obtained first edge enhancement images of the four-directions, the pixel values of other pixels are set to zero, and thereby a second edge enhancement image corresponding to each of the four directions is generated (Step S13). A smoothing process is performed to the generated second edge enhancement image corresponding to each of the four directions, which generates an edge feature image corresponding to each of the four directions (Step S14). Then, the edge feature image corresponding to each of the four directions is delivered (Step S15).

(5) Face Detecting Process in Step S4 of FIG. 2

(5-1) Weighting Table

Figure 6:
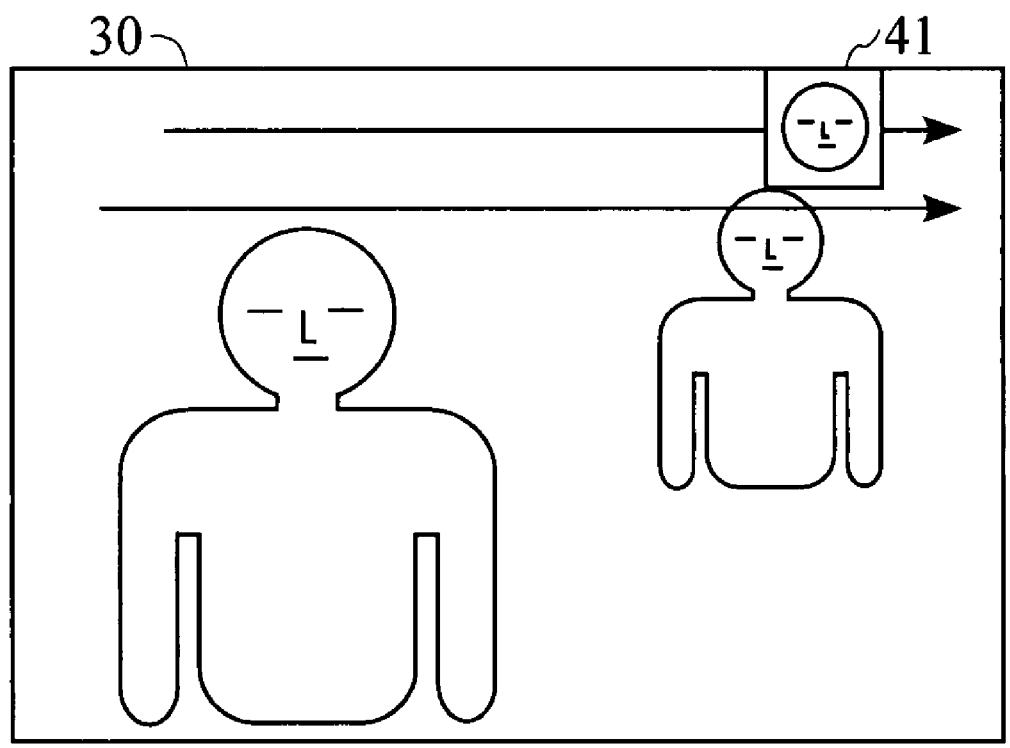
FIG. 6 is a schematic view explaining a face detecting process of Step S4 of FIG. 2.
Figure 7A:
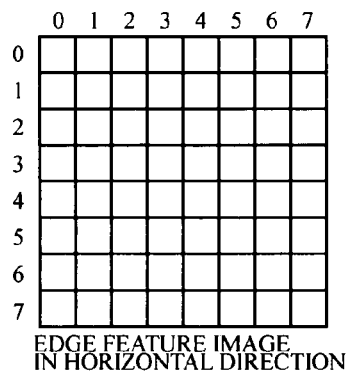
FIGS. 7A to 7D are schematic views showing four-direction edge feature images corresponding to a determination region in an input image.
Figure 7B:
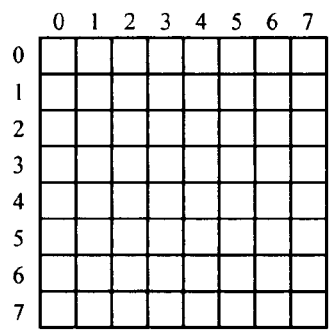
Figure 7C:
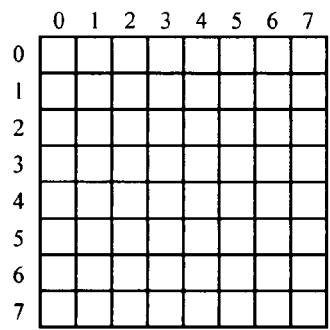
Figure 7D:
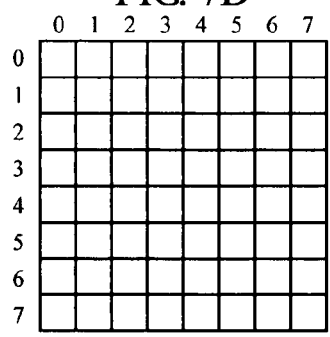

FIG. 6 is a schematic view explaining a face detecting process of Step S4 of FIG. 2.

Although the face detecting process in Step S4 of FIG. 2 is performed to each hierarchical image, because of the same processing method, only the face detecting process performed to the input image 30 will be described. In FIG. 6 the numeral 30 designates the input image and the numeral 41 designates the determination region set in the input image. In the face detection, the determination whether or not a frontal face, a profile face, and an obliquely viewed face exist in the image is made for each of the frontal face, the profile face, and the obliquely viewed face. For the sake of convenience, only the detection whether or not the frontal face exists will be described below.

FIGS. 7A to 7D show the four-direction edge feature images corresponding to the determination region in the input image. As described above, the size of the determination region 41 has the 24 by 24 matrix. However, for the sake of convenience, the size of the determination region 41 has the 8 by 8 matrix in FIGS. 7A to 7D. FIG. 8 shows an example of contents of the weighting table in the case where the size of the determination region 41 is set to 8 by 8 matrix.

In the size of the determination region 41, it is assumed that a pixel position of each edge feature image is expressed by a kind q (edge number: 0 to 3) of the edge feature image and a row number y (0 to 7) and a column number x (0 to 7). A weight w is stored in the weighting table. In each feature pixel used for the face detection in the pixels of each edge feature image, the weight w indicates face likelihood corresponding to a feature amount (pixel value) within the pixel.

In the example of FIG. 8, the edge number of the horizontal edge feature image is set to "0", the edge number of the vertical edge feature image is set to "1", the edge number of the obliquely upper right edge feature image is set to "2", and the edge number of the obliquely upper left edge feature image is set to "3".

Such weighting tables can be produced using a known learning method called adaboost (Yoav Freund and Robert E. Schapire, "A decision theoretic generalization of on-line learning and an application to boosting", European Conference on Computational Leaning Theory, Sep. 20, 1995).

The adaboost is one of adaptive boosting learning methods. In the adaboost, plural weak classifiers which are effective for classification are selected from plural weak classifier candidates based on a large amount of teacher samples, and high-accuracy classifier is realized by weighting and integrating the weak classifiers. As used herein, the weak classifier shall mean a classifier which is not enough to satisfy the accuracy while having a classification capability higher than a pure accident. In selecting the weak classifier, when the already-selected weak classifier exists, the learning focuses on a teacher sample which is wrongly recognized by the already-selected weak classifier, which selects the weak classifier having the highest effect from the remaining weak classifier candidates.

The face detecting process is performed in each hierarchical image using the weighting table and the four-direction edge feature images corresponding to the determination region set in the image.

(5-2) Procedure of Face Detecting Process

Figure 9:
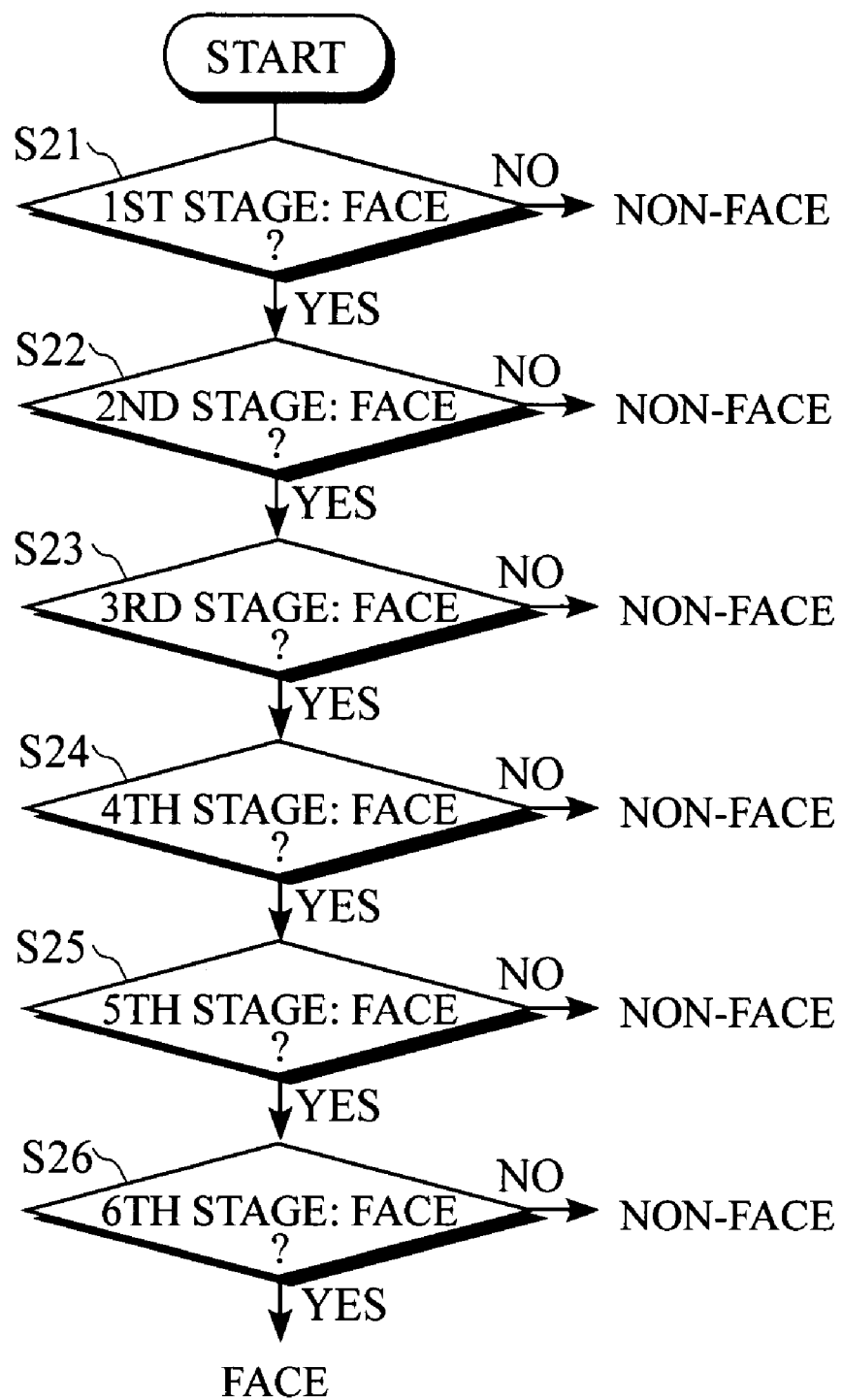
FIG. 9 is a flowchart showing a procedure of the face detecting process performed to the determination region set in the input image.

FIG. 9 shows the procedure of the face detecting process performed to the determination region set in the input image.

The face detecting process includes determination steps from a first determination step (Step S21) to a sixth determination step (Step S26). The determination steps differ from one another in the number of feature pixels N used for the determination. In the first determination step (Step S21) to the sixth determination step (Step S26), the numbers of feature pixels N used for the determination are set to N1 to N6 (N1<N2<N3<N4<N5<N6) respectively.

When the face is not detected in a certain determination step, the flow does not go to the next determination step, but it is determined that the face does not exist in the determination region. Only when the face is detected in all the determination steps, it is determined that the face exists in the determination region.

(5-3) Procedure of Determination Process in Each Determination Step

Figure 10:
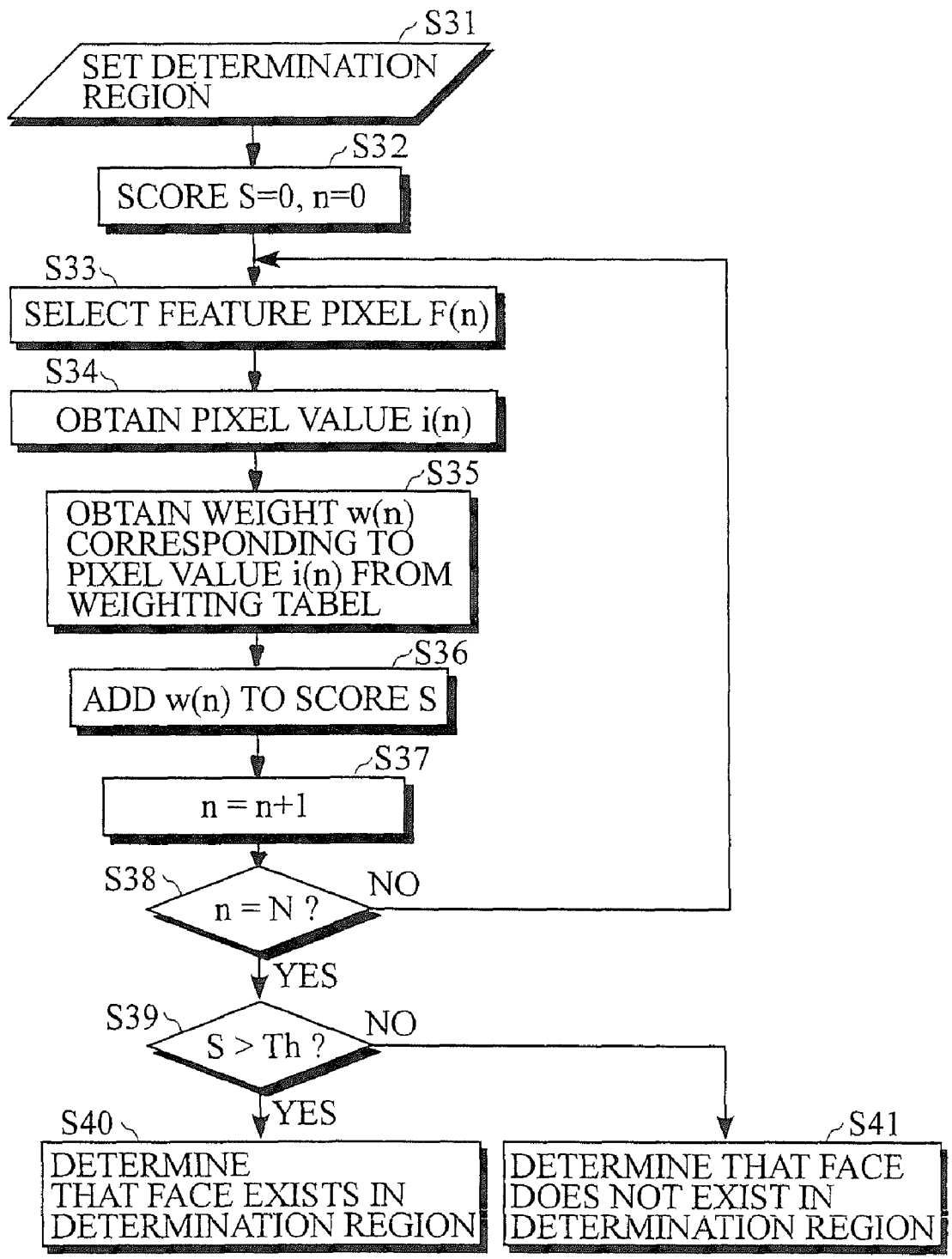
FIG. 10 is a flowchart showing a procedure of a determination process performed in each determination step of FIG. 9.

FIG. 10 shows the procedure of the determination process performed in each determination step of FIG. 9.

The case where the determination is made to one determination region using N feature pixels will be described below. The determination region is set (Step S31), and a variable S indicating a score is set to zero while a variable n expressing the number of feature pixels in which the weight is obtained is set to zero (Step S32).

A feature pixel F(n) is selected (Step S33). As described above, the feature pixel F(n) is expressed by the edge number q, the row number y, and the column number x. In the example of FIG. 10, it is assumed that the feature pixels F(0), F(1), F(2), . . . are selected in the order important to the face detection from the feature pixels in which the weight is stored in the weighting table.

A pixel value i(n) corresponding to the selected feature pixel F(n) is obtained from the edge feature image corresponding to the determination region (Step S34). A weight w(n) corresponding to the pixel value i(n) of the feature pixel F(n) is obtained from the weighting table (Step S35). The obtained weight w(n) is added to the score S (Step S36).

Then, n is incremented by one (Step S37). It is determined whether or not n is equal to N (Step S38). When n is not equal to N, the flow returns to Step S33, and the processes of Steps S33 to S38 are performed using the updated n.

When the processes of Steps S33 to S36 are performed to the N feature pixels, n becomes equal to N in Step S38, so that the flow goes to Step S39. In Step S39, when the number of feature pixels is N, it is determined whether or not the score S is more than a predetermined threshold Th. When the score S is more than the threshold Th, it is determined that the face exists in the determination region (Step S40). On the other hand, when the score S is not more than the threshold Th, it is determined that the face does not exist in the determination region (Step S41).

(6) Modification of Procedure of Face Detecting Process

As shown in FIG. 9, because the face detecting process includes multi-stage determination steps, it takes a long time to perform all the determination steps. Therefore, in order to reduce the processing time, when the score is not lower than a default in a certain determination step, the next determination step is skipped.

Figure 11:
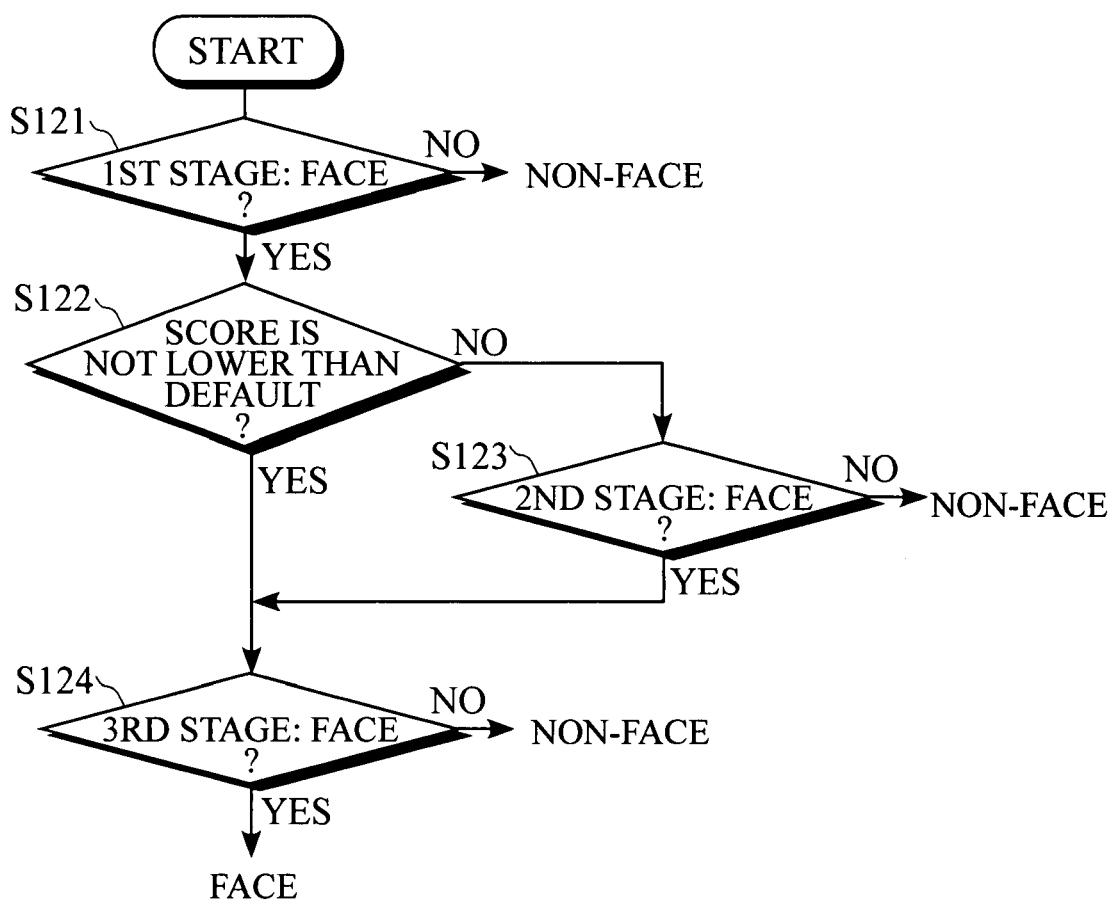
FIG. 11 is a flowchart showing a modification of the face detecting process.

FIG. 11 shows the procedure of the face detecting process when the face detecting process includes the three-stage determination step.

The face detecting process includes a first determination step (Step S121), a second determination step (Step S123), and a third determination step (Step S124). The determination steps differ from one another in the number of feature pixels N used for the determination. The first determination step to the third determination step, the numbers of feature pixels N used for the determination are set to N1 to N3 (N1<N2<N3) respectively. The process similar to the process shown in FIG. 10 is performed in each determination step.

When the face is not detected in the first determination step (Step S121), the flow does not go to the next determination step, but it is determined that the face does not exist in the determination region. When the face is detected in the first determination step (Step S121), it is determined whether or not the score S computed in the first determination step is not lower than the default (Step S122). In the first determination step, the default is set to a value larger than the threshold Th used to determine whether or not the face exists.

When the score S is lower than the default, flow goes to the second determination step (Step S123). In Step S123, the process of the second determination step is performed like FIG. 9. When the score S is not lower than the default in Step S122, the flow skips the second determination step to transfer to the third determination step (Step S124). In the modification, the processing time can be shortened.

(7) Modification of Weighting Table

In the first embodiment, the face detecting process is performed using the weighting table. As shown in FIG. 8, in the weighting table, the weight w indicating the face likelihood is stored in each feature pixel used for the face detection while corresponding to each of possible pixel values (0 to M). Accordingly, in the weighting table, a large memory capacity is required due to the large amount of data.

In the modification, a coefficient table in which a polynomial coefficient is stored in each feature pixel used for the face detection is used in place of the weighting table. The coefficient table is produced from the same data as the weighting table. A method of producing the coefficient table for a certain feature pixel will be described below.

Figure 12:
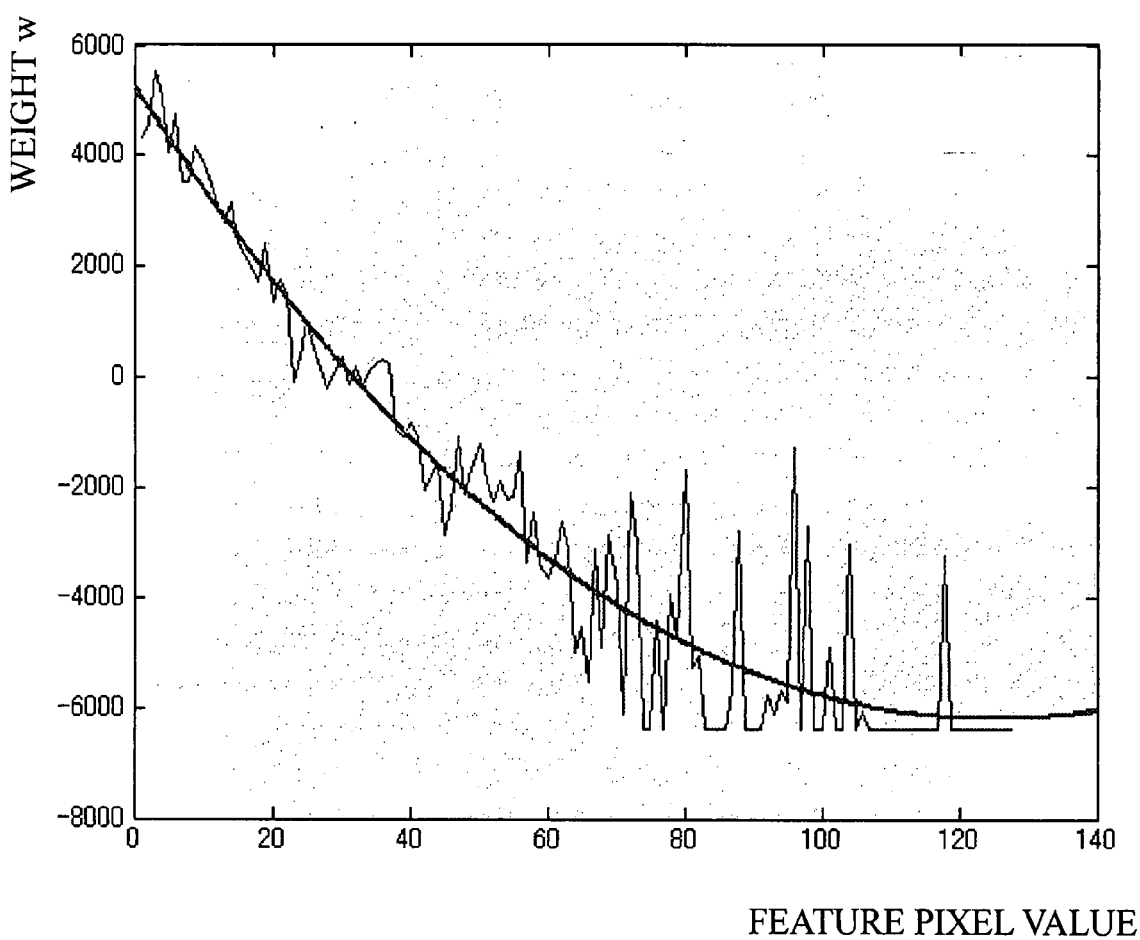
FIG. 12 is a graph showing a weighting table value (hereinafter referred to as table value) and a polynomial curve which approximates the table value of each pixel value of a feature pixel, when a certain pixel value of the feature pixel is set to a horizontal axis while a weight w is set to a vertical axis.

FIG. 12 shows a weighting table value (hereinafter referred to as table value) when a pixel value of a certain feature pixel is set to the horizontal axis while the weight w is set to the vertical axis. A function for approximating the table value in each pixel value of the feature pixel is obtained in the modification. In other words, a function for obtaining the weight w indicating the face likelihood is determined for the pixel value. A smooth curve shown in FIG. 12 is a fitting function (polynomial curve). In the example of FIG. 12, a three-dimensional polynomial is used as the fitting function. An order of the fitting function can arbitrarily be determined.

Usually a least square method is used in fitting the table value to polynomial curve. That is, the coefficient of the function is obtained in each pixel value to minimize a square of a difference between the table value and the function with which the table value is approximated. Assuming that w(n) is the weight of the feature pixel F(n) and i(n) is the pixel value of the feature pixel F(n), the three-dimensional fitting function is expressed by the following equation (1).

$$w(n)=a_3 \cdot i(n)^3+a_2 \cdot i(n)^2+a_1 \cdot i(n)+a_0 \quad (1)$$

The coefficient value of each feature pixel is obtained in each feature pixels by determining the coefficient values $a_0$, $a_1$, $a_2$, and $a_3$ such that the square of the table value and the function becomes the minimum in each pixel value.

FIG. 13 shows an example of contents of the coefficient table when the size of the determination region is set to an 8 by 8 matrix. The three figures on the left of the coefficient table indicate the edge number q, the row number y, and the column number x from the left. In the pixels of each edge feature image, the coefficient values $a_0$, $a_1$, $a_2$, and $a_3$ are stored in the coefficient table in each feature pixel used for the face detection.

Figure 14:
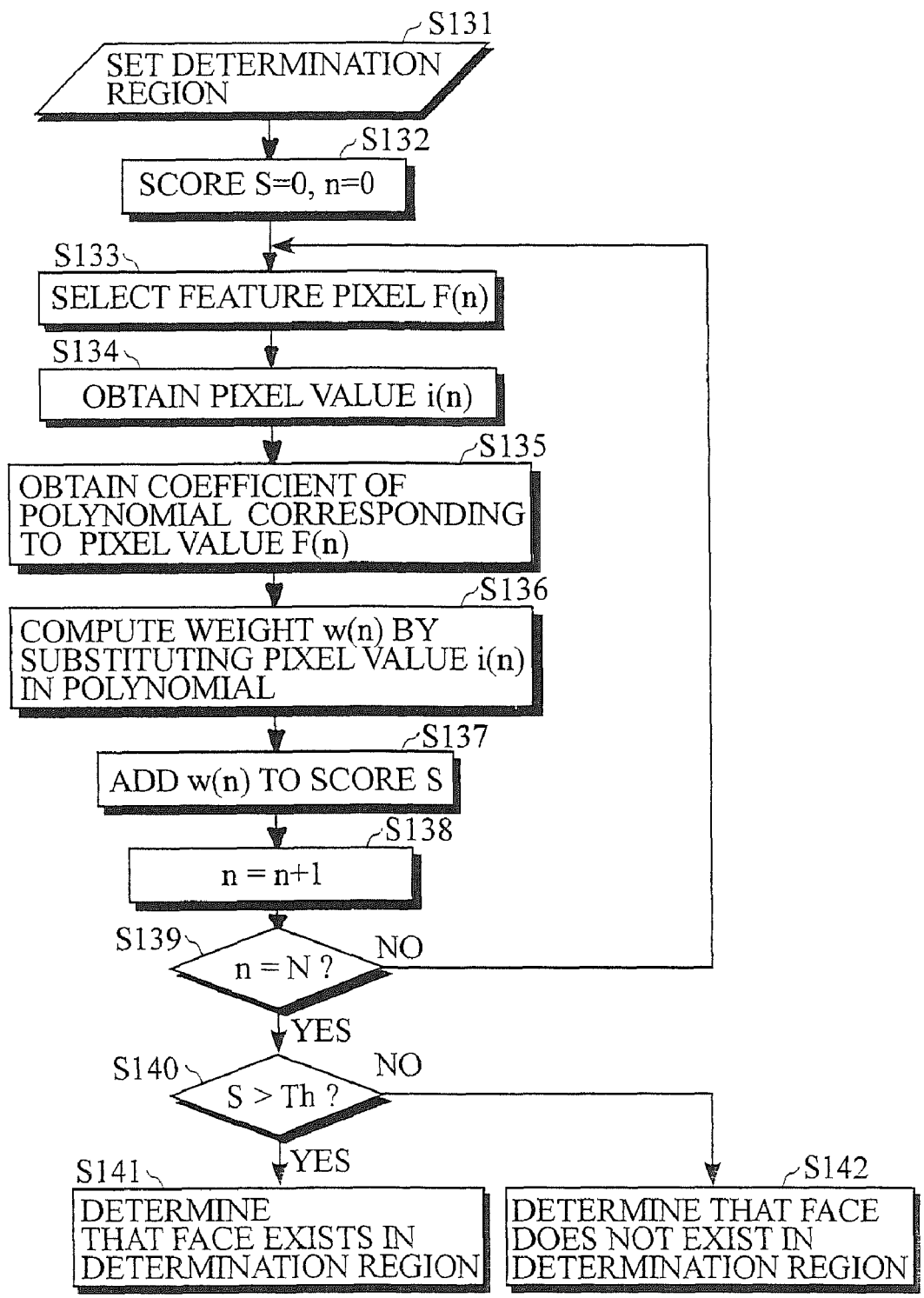
FIG. 14 is a flowchart showing a procedure of determination process in the case of use of the coefficient table.

In the case where the coefficient table is used in place of the weighting table, a determination process shown in FIG. 14 is used in place of the determination process shown in FIG. 10.

The case where the determination is made using the N feature pixels will be described. First the determination region is set (Step S131). The variable S indicating the score is set to zero while the variable n indicating the number of feature pixels in which the weight is obtained is set to zero (Step S132).

Then, the feature pixel F(n) is selected (Step S133). The feature pixel F(n) is expressed by the edge number q, the row number y, and the column number x. In the example of FIG. 14, it is assumed that the feature pixels F(0), F(1), F(2), . . . are selected in the order important to the face detection from the feature pixels in which the coefficient is stored in the coefficient table.

A pixel value i(n) corresponding to the selected feature pixel F(n) is obtained from the edge feature image corresponding to the determination region (Step S134). The coefficient values $a_0$, $a_1$, $a_2$, and $a_3$ of the polynomial corresponding to the feature pixel F(n) are obtained from the coefficient table (Step S135). The weight w(n) is computed from the polynomial of the equation (1) using the obtained pixel value i(n) and the coefficient values $a_0$, $a_1$, $a_2$, and $a_3$ (Step S136). The obtained weight w(n) is added to the score S (Step S137).

Then, n is incremented by one (Step S138). It is determined whether or not n is equal to N (Step S139). When n is not equal to N, the flow returns to Step S133, and the processes of Steps S133 to S139 are performed using the updated n.

When the processes of Steps S133 to S138 are performed to the N feature pixels, n becomes equal to N in Step S139, so that the flow goes to Step S140. In Step S140, when the number of feature pixels is N, it is determined whether or not the score S is more than a predetermined threshold Th. When the score S is more than the threshold Th, it is determined that the face exists in the determination region (Step S141). On the other hand, when the score S is not more than the threshold Th, it is determined that the face does not exist in the determination region (Step S142).

The weighting table of FIG. 8 is compared to the coefficient table of FIG. 13 in the data amount. The three-dimensional is used as the fitting function. When the possible pixel value of the feature pixel ranges from zero to M, the data amount of the coefficient table becomes 4/M of the data amount of the weighting table. Letting M=255 leads to a data reduction rate of 4/255=0.016.

Figure 15:
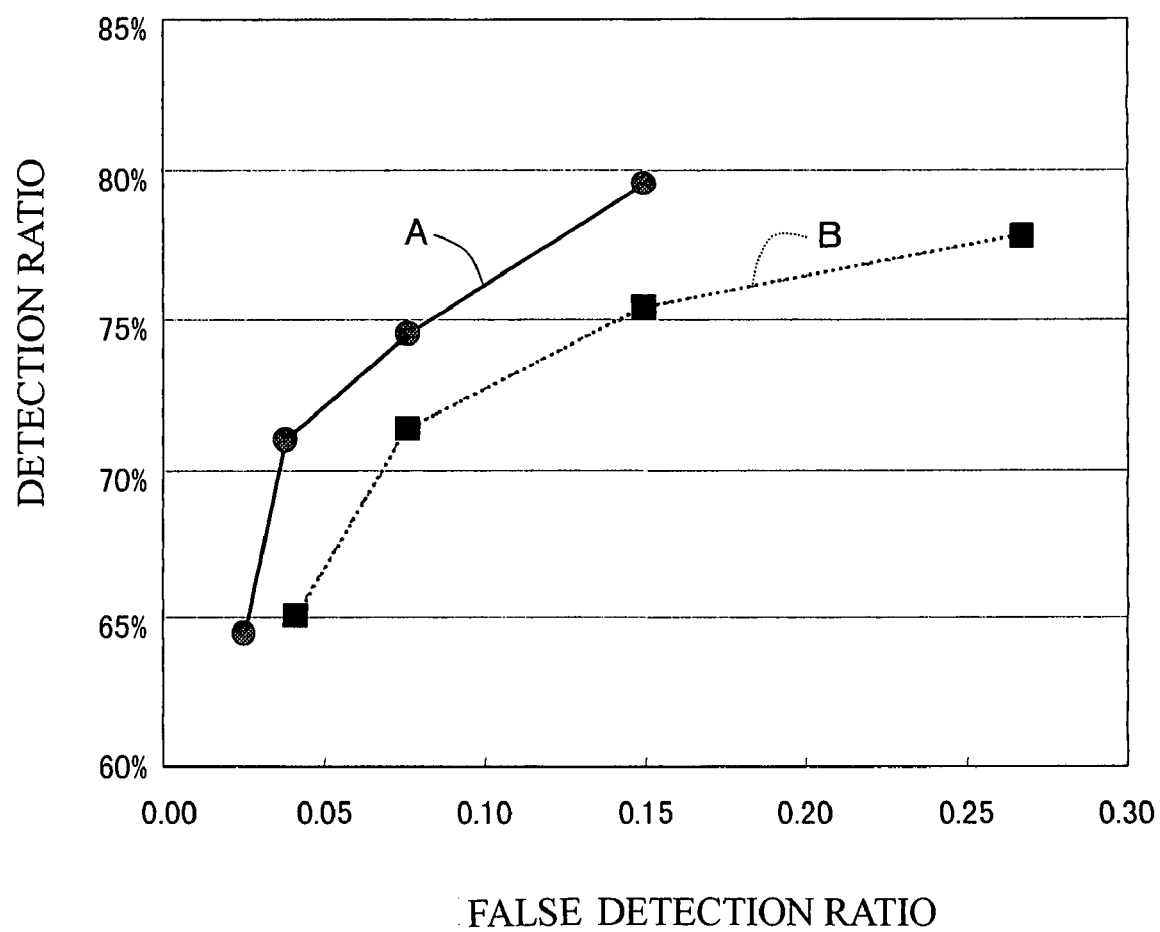
FIG. 15 is a graph showing a relationship (polygonal line A) between a detection ratio and a false detection ratio in the case of use of a coefficient table (polynomial) and a relationship (polygonal line B) between a detection ratio and a false detection ratio in the case of use of a weighting table.

FIG. 15 shows a relationship (polygonal line A) between a detection ratio and a false detection ratio in the case of use of the coefficient table (polynomial) and a relationship (polygonal line B) between a detection ratio and a false detection ratio in the case of use of the weighting table.

The detection ratio shown in the vertical axis shall mean a ratio of the number of faces which is successfully detected to the total number of faces included in the evaluation image. The false detection ratio shown in the horizontal axis shall mean a ratio of the number of times at which a non-face portion is wrongly detected as the face to the number of evaluation images. The relationship between the detection ratio and the false detection ratio draws one curve by changing a setting value (threshold Th) of detection sensitivity. Each plot (round or square point) on a polygonal line graph of FIG. 15 indicates data actually obtained by changing the threshold Th.

Preferably the detection ratio is increased, and the data indicating the relationship between the detection ratio and the false detection ratio is located on the upper side in FIG. 15. On the other hand, preferably the false detection ratio is decreased, and the data indicating the relationship between the detection ratio and the false detection ratio is located in the left side in FIG. 15. As shown in FIG. 15, the relationship (polygonal line A) between the detection ratio and the false detection ratio in the case of the use of the coefficient table (polynomial) is located on the upper left side of the relationship (polygonal line B) between the detection ratio and the false detection ratio in the case of the use of the weighting table. Therefore, in point of the face detection accuracy, it is found that the use of the coefficient table (polynomial) is superior to the use of the weighting table.

The reason is as follows. The weight w of the weighting table is computed based on the large amount of learning data (image data). As shown by the polygonal line of FIG. 12, in the polygonal line connecting the table values of the weights w of the pixel values, an amplitude is partially increased depending on the pixel value. Because the pieces of the learning data is the finite pieces despite of the large amount of learning data, the weight fluctuates for the pixel value of which few pieces of data are included in the learning data while the weight is accurately computed for the pixel value of which many pieces of data are included in the learning data.

On the other hand, in the case of the use of the polynomial, the weight is expressed by the curve of FIG. 12 for each pixel value, and the weight is imparted even to the pixel value of which few pieces of data are included in the learning data according to the overall tendency. As a result, it is believed that the face detection accuracy is improved in the use of the coefficient table (polynomial) when compared with the use of the weighting table.

In the modification, the polynomial is used as the function (fitting function) which approximates the table value in each pixel value of the feature pixel. Alternatively, a mixed Gaussian distribution may be used as the fitting function. That is, the table value in each pixel value of the feature pixel is approximated by overlapping the plural Gaussian distributions.

Assuming that w(n) is the weight of the feature pixel F(n) and i(n) is the pixel value of the feature pixel F(n), the fitting function with the mixed Gaussian distribution is expressed by the following equation (2).

$$w(n) = \Sigma a_m \cdot \exp\{(i(n) \cdot b_m)/c_m\} \quad (2)$$

Assuming that M is the number of Gaussian distributions, $a_m$ (m=1, 2, ..., and M) is a composite coefficient, $b_m$ (m=1, 2, ..., and M) is an average, and $c_m$ (m=1, 2, ..., and M) is a variance. These parameters are stored in the coefficient table.

Second Embodiment

In embodiments from a second embodiment, the case where the weighting table is used will be described in the weighting table and the coefficient table. However, the coefficient table may be used.

A second embodiment is characterized in that the number of kinds of the generated reduced images can be decreased compared with the first embodiment although the number of kinds of detectable face sizes is equal to that of the first embodiment.

Figure 16:
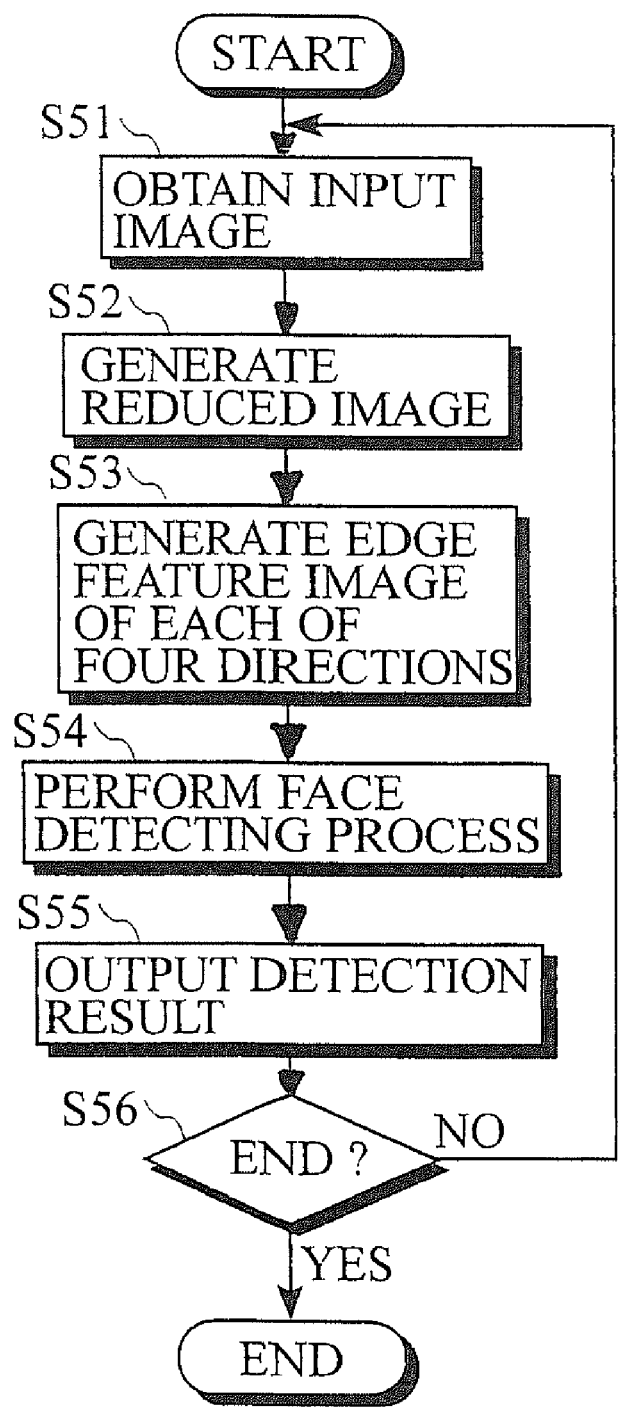
FIG. 16 is a flowchart showing an operation of a face detection apparatus.

FIG. 16 shows an operation of a face detection apparatus of the second embodiment.

First the input image is obtained (Step S51), and one or plural reduced images are generated from the input image (Step S52). The edge feature image is generated in each of the four directions in each hierarchical image which is formed by the input image and the reduced image (Step S53). The face detecting process is performed using each edge feature image and the weighting table (Step S54), and the detection result is delivered (Step S55). When the command for ending the face detection is not inputted (Step S56), the flow returns to Step S51. When the command for ending the face detection is inputted in Step S56, the flow is ended.

Figure 17:
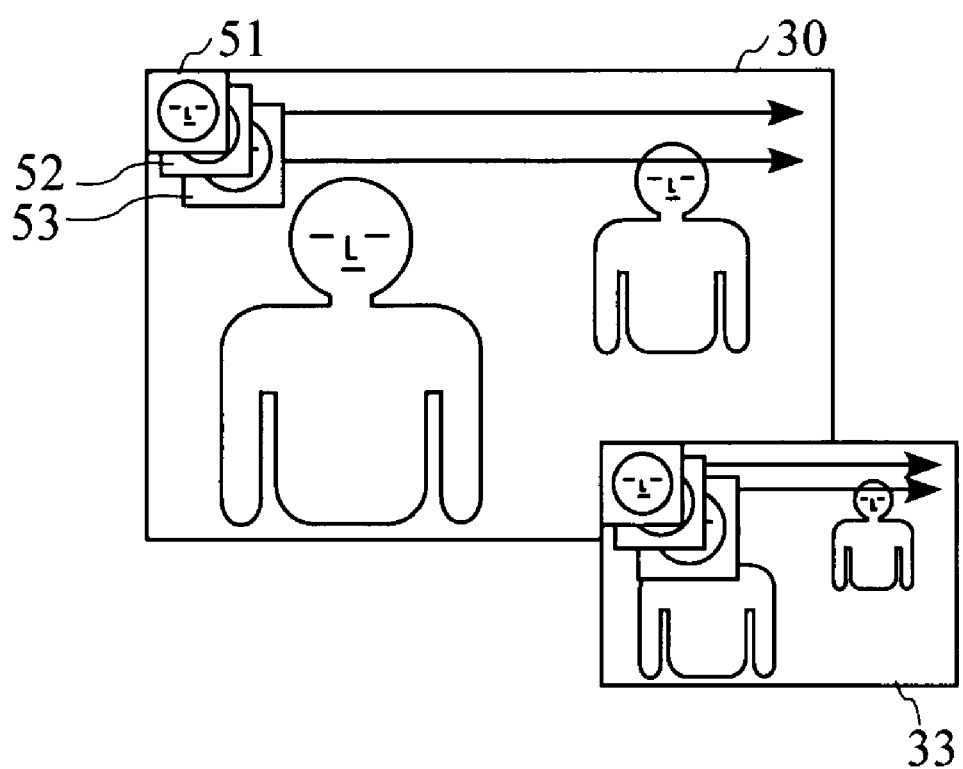
FIG. 17 is a schematic view showing two hierarchical images obtained through Step S52 of FIG. 16 and plural kinds of determination regions.

In the reduced image generating process in Step S52, as shown in FIG. 17, the reduced image 33 is generated from the input image 30 using a reduction ratio $R_M = R^3$ three times the reduction ratio R of the first embodiment. In the case where the reduction ratio R of the first embodiment is set to 0.8, the reduction ratio $R_M$ becomes $0.512 \cong 0.5$. The number of hierarchical images is two in the second embodiment while the number of hierarchical images is six in the first embodiment. In Step S53, as with the first embodiment, the edge feature image of each of the four directions is generated in each hierarchical image.

In the second embodiment, because the number of kinds of the detectable face sizes is equalized to that of the first embodiment, the face detection is performed using the determination regions 51, 52, and 53 having the three kinds of the face sizes. The sizes of the determination regions 51, 52, and 53 are set to T1 by T1, T2 by T2, and T3 by T3 matrixes respectively, and the reduction ratio used in the first embodiment is set to R. Then, T1, T2, and T3 are determined such that the following equation (3) holds.

$$T1 = R \times T2$$

$$T2 = R \times T3$$

$$T1 = R2 \times T3 \quad (3)$$

Letting R=0.8 and T1=24 leads to T2=30 and T3=37.5. However, T3 is set to 36 from the standpoint of convenience on the computation. The three kinds of the weighting tables are previously produced according to the three kinds of the determination regions and stored in the memory.

As with the first embodiment, the face detecting process in Step S54 is performed in each hierarchical image. However, the face detecting process is performed to each hierarchical image using the three kinds of the determination regions 51, 52, and 53.

Figure 18:
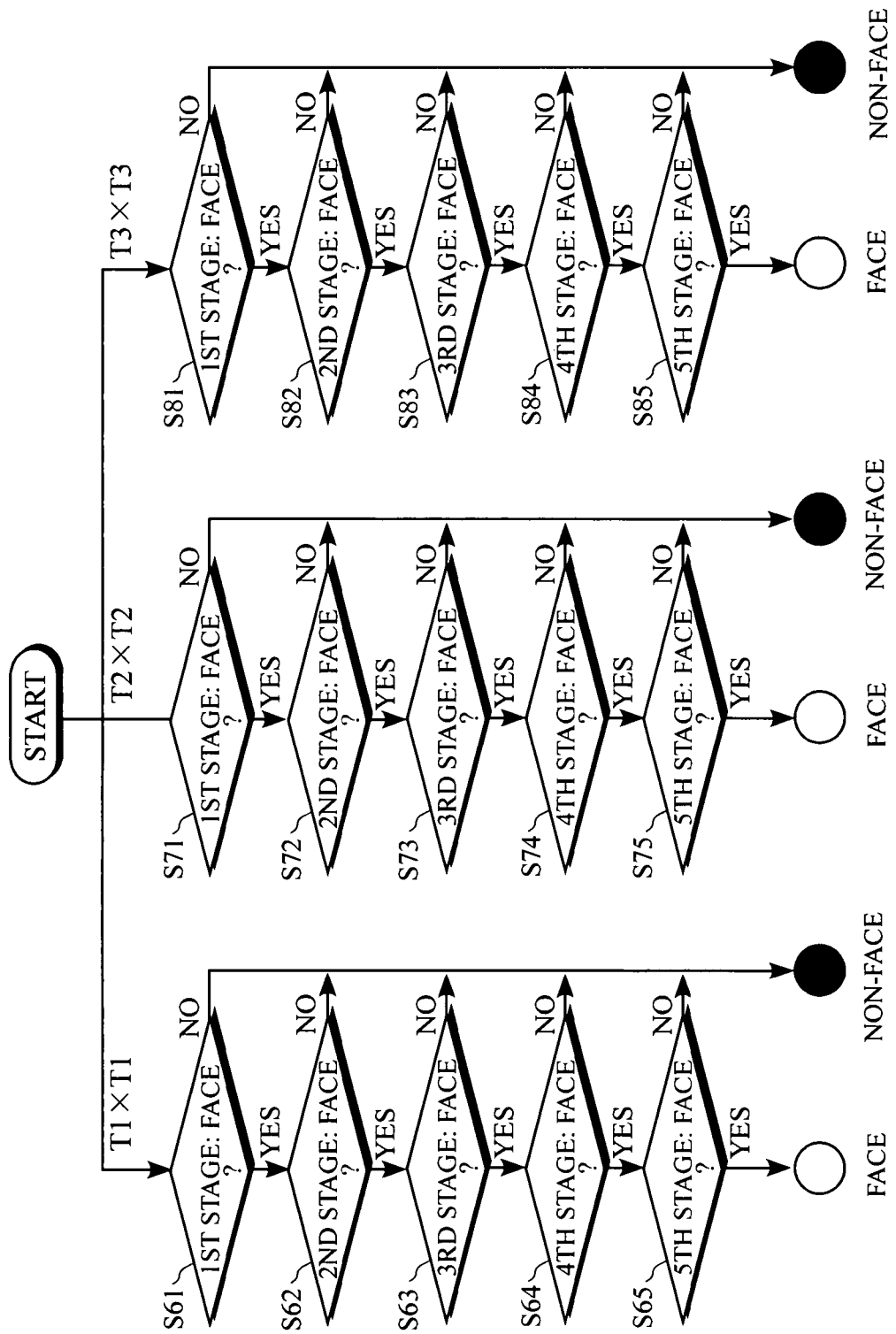
FIG. 18 is a flowchart showing a procedure of a face detecting process performed to three kinds of determination regions in an input image.

FIG. 18 shows the procedure of the face detecting process performed to the three kinds of determination regions in the input image.

In the second embodiment, the face detecting process is performed to each of the three kinds of the determination regions 51, 52, and 53.

The face detecting process which is performed to the determination region 51 having the T1 by T1 matrix in the input image includes determination steps from a first determination step (Step S61) to a fifth determination step (Step S65). The determination steps differ from one another in the number of feature pixels N used for the determination. In the first determination step (Step S61) to the fifth determination step (Step S65), the numbers of feature pixels N used for the determination are set to N1 to N5 (N1<N2<N3<N4<N5) respectively. When the face is not detected in a certain determination step, the flow does not go to the next determination step, but it is determined that the face does not exist in the determination region. Only when the face is detected in all the determination steps, it is determined that the face exists in the determination region 51. The determination process performed in each determination step is similar to that of FIG. 10.

As with the face detecting process performed to the determination region 51, the face detecting process which is performed to the determination region 52 having the T2 by T2 matrix in the input image also includes determination steps from a first determination step (Step S71) to a fifth determination step (Step S75). As with the face detecting process performed to the determination region 51, the face detecting process which is performed to the determination region 53 having the T3 by T3 matrix in the input image also includes determination steps from a first determination step (Step S81) to a fifth determination step (Step S85).

In the second embodiment, because the number of reduced images is smaller than that of the first embodiment, the processing amount is remarkably decreased in both the reduction process and the process of generating the edge feature image of each of the four directions. On the contrary, because the face detecting process is performed in each of the plural kinds of the determination regions having the different sizes, the number of the face detecting processes is increased for one image when all the determination steps are processed. However, for the determination region where the face does not exist, in the first-half determination steps in which the few number of feature pixels is used, it is determined that the face does not exist. Therefore, the processing can be realized at relatively high speed. As a result, when compared with the first embodiment, the overall processing amount is decreased to achieve the high-speed processing.

Third Embodiment (1) Face Detection Method When Rotation Angle of Detection-Target Face is Changed (1-1) In the Case of −90°, +90°, and +180° Rotation Angles FIGS. 19A to 19D show examples of the input images when a rotation angle of a detection-target face is changed.

An image 61 of FIG. 19A shows the case where the face is in an upright state (default rotation angle position of 0°) in the horizontal image which is frequently used in a digital camera and the like. An image 62 of FIG. 19B shows the case where the face is rotated clockwise by +90° from the default rotation angle position. An image 63 of FIG. 19C shows the case where the face is rotated clockwise by −90° from the default rotation angle position. An image 64 of FIG. 19D shows the case where the face is rotated by 180° from the default rotation angle position.

In order to detect the faces having the different rotation angle positions using the one kind of the weighting table produced for the default rotational position, it is necessary that the input image is rotated to generate the edge feature images of the four directions to the post-rotation image. However, the processing amount is increased because not only the rotating process is required but also the edge feature image is generated in each post-rotation image.

Alternatively, the weighting table is prepared for other rotation angle positions (+90°, −90°, 180°) in addition to the weighting table produced for the default rotational position, and the face detection may be performed to the determination region having any position in each rotation angle position using the corresponding weighting table. In this method, it is not necessary to rotate the image, but it is necessary to produce and hold the weighting table for each rotation angle position.

The third embodiment is characterized in that the faces having the different rotation angle positions can be detected without rotating the input image using the one kind of the weighting table produced for the default rotational position.

Figure 20:
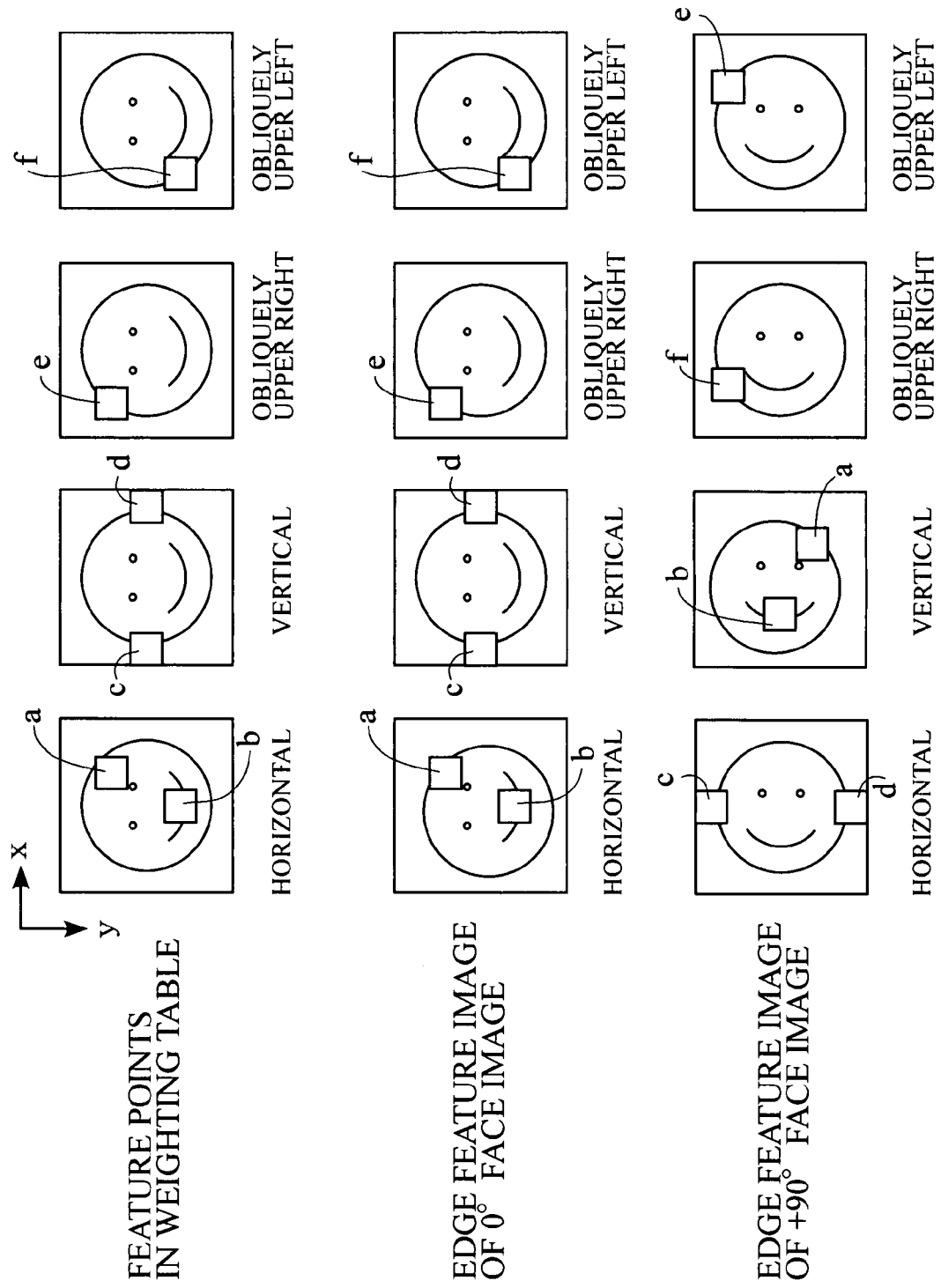
FIG. 20 is a schematic view showing a correspondence between a feature point (feature pixel) assigned by a weighting table and a feature point on a face image in an upright state and a correspondence between the feature point (feature pixel) assigned by the weighting table and a feature point on a face image rotated by +90°.

FIG. 20 shows a correspondence between the feature point (feature pixel) assigned by the weighting table and the feature point on the face image in the upright state and a correspondence between the feature point (feature pixel) assigned by the weighting table and the feature point on the face image which is rotated by +90°.

In the upper portion of FIG. 20, the feature point (indicated by q, y, and x) assigned in the weighting table is shown in each edge number (edge direction). In the middle portion of FIG. 20, the feature points are shown in the four-direction edge feature images corresponding to the upright face image. In the lower portion of FIG. 20, the feature points in the four-direction edge feature images corresponding to the face image which is rotated by +90°.

In the four-direction edge feature images corresponding to the face image which is rotated by +90°, the feature points a to f assigned in the weighting table emerge as shown in the lower portion of FIG. 20. That is, the feature points a and b corresponding to the horizontal edge direction assigned in the weighting table emerge in the vertical edge feature image in the edge feature images corresponding to the face image which is rotated by +90°. The feature points c and d corresponding to the vertical edge direction assigned in the weighting table emerge in the horizontal edge feature image in the edge feature images corresponding to the face image which is rotated by +90°.

The feature point e corresponding to the obliquely upper right edge direction assigned in the weighting table emerges in the obliquely upper left edge feature image in the edge feature images corresponding to the face image which is rotated by +90°. The feature point f corresponding to the obliquely upper left edge direction assigned in the weighting table emerges in the obliquely upper right edge feature image in the edge feature images corresponding to the face image which is rotated by +90°.

Figure 21:
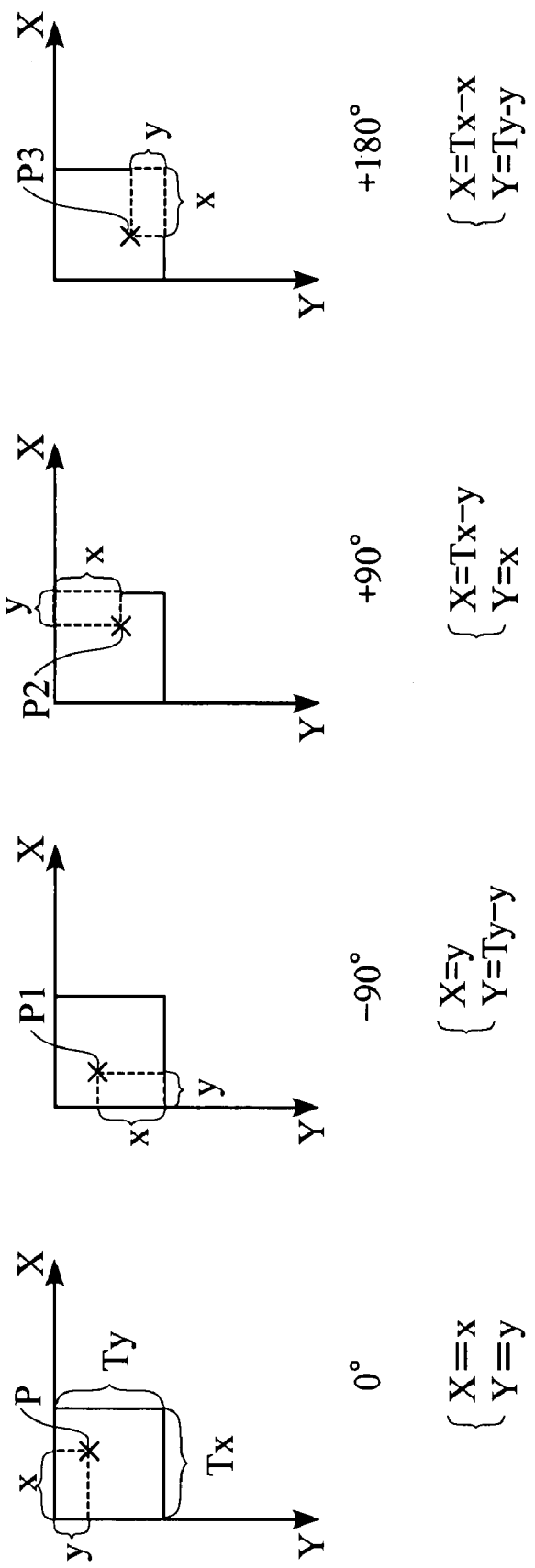
FIG. 21 is a schematic view showing a relationship, between an xy coordinate of the feature point (feature pixel) assigned by the weighting table and an xy coordinate of feature points corresponding to −90°, +90°, and 180° face images (edge feature images)

Assuming that x and y are an xy coordinate of the feature point assigned in the weighting table while X and Y are an xy coordinate of the feature point in the edge feature image corresponding to the face image which is rotated by +90°, the relationship between the xy coordinates becomes the relationship between a point P and a point P2 of FIG. 21 in the corresponding feature points. Accordingly, a relational expression shown by the following equation (4) holds.

$$X = Tx \cdot y$$
$$Y = x \quad (4)$$

As shown in FIG. 21, Tx is a length in the horizontal direction of the determination region and Ty is a length in the vertical direction of the determination region.

A relationship shown in Table 1 holds between the position (q,y,x) of the feature point assigned in the weighting table and the position (Q,Y,X) of the corresponding feature point on the face image (edge feature image) which is rotated by +90°. Similarly a relationship shown in Table 1 holds between the position (q,y,x) of the feature point assigned in the weighting table and the position (Q,Y,X) of the corresponding feature point on the face image (edge feature image) which is rotated by −90° or 180°. In the face detection in which models such as a profile face and an oblique face are used, sometimes the detection-target face image is flipped horizontally or vertically. There is a relationship shown in Table 1 between the position (q,y,x) of the feature point assigned in the weighting table and the position (Q,Y,X) of the corresponding feature point on the horizontally or vertically-flipped face image (edge feature image).

TABLE 1

|  | 0° (Default direction) | −90° | +90° | 180° | Flip horizontal | Flip vertical |
|---|---|---|---|---|---|---|
| Correspondence of edge image (edge number q) | Vertical Horizontal Upper right Upper left | Horizontal Vertical Upper left Upper right | Horizontal Vertical Upper left Upper right | Vertical Horizontal Upper right Upper left | Vertical Horizontal Upper left Upper right | Vertical Horizontal Upper left Upper right |
| Correspondence of xy coordinate | X = x  Y = y | X = y  Y = Ty − x | X = Tx − y  Y = x | X = Tx − x  Y = Ty − y | X = Tx − x  Y = y | X = x  Y = Ty − y |

The relationship of the point P and the point P1 shown in FIG. 21 is obtained between the xy coordinate of the feature point assigned in the weighting table and the xy coordinate of the corresponding feature point on the face image (edge feature image) which is rotated by −90°. The relationship of the point P and the point P3 shown in FIG. 21 is obtained between the xy coordinate of the feature point assigned in the weighting table and the xy coordinate of the corresponding feature point on the face image (edge feature image) which is rotated by 180°.

Using the weighting table produced for the default rotational position, the face image in which the default face image is rotated by +90°, −90°, or 180° and the face image (edge feature image) in which the default face image is horizontally or vertically flipped can be detected by utilizing the relationships in Table 1.

Specifically, for example, in the case where the face image which is rotated by +90° is detected, when the feature pixel F(n) is selected in Step S33 of FIG. 10, the selected feature pixel F(n) is converted into the corresponding feature pixel F'(n) on the face image (edge feature image) which is rotated by +90° based on the relationship of Table 1. In Step S34, the pixel value i(n) of the post-conversion feature pixel F'(n) is captured from the edge feature image. In Step S35, the weight w(n) corresponding to the pixel value i(n) of the feature pixel F(n) is obtained from the weighting table. The processes subsequent to Step S35 are similar to those of the first and second embodiments.

(1-2) In the Case of −45°, +45°, +135°, and −135° Rotation Angles

FIGS. 22A to 22D show examples of the input images when the rotation angle of the detection-target face is changed.

Figures 22A, 22B, 22C, 22D:
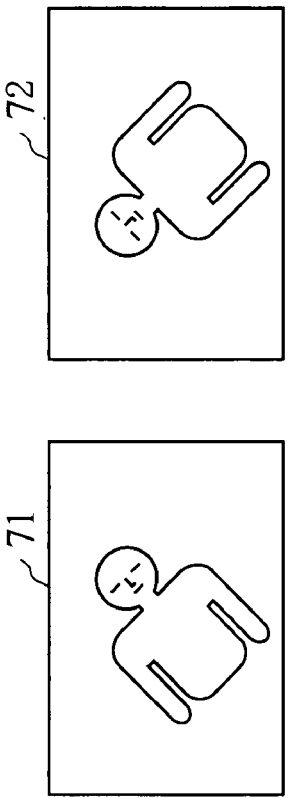
FIGS. 22A to 22D are schematic views showing examples of the input images when the rotation angle of the detection-target face is changed.

An image 71 of FIG. 22A shows the case where the face is rotated clockwise by +45° from the default rotation angle position). An image 72 of FIG. 22B shows the case where the face is rotated clockwise by −45° from the default rotation angle position. An image 73 of FIG. 22C shows the case where the face is rotated clockwise by +135° from the default rotation angle position. An image 74 of FIG. 22D shows the case where the face is rotated clockwise by −135° from the default rotation angle position.

Figure 23:
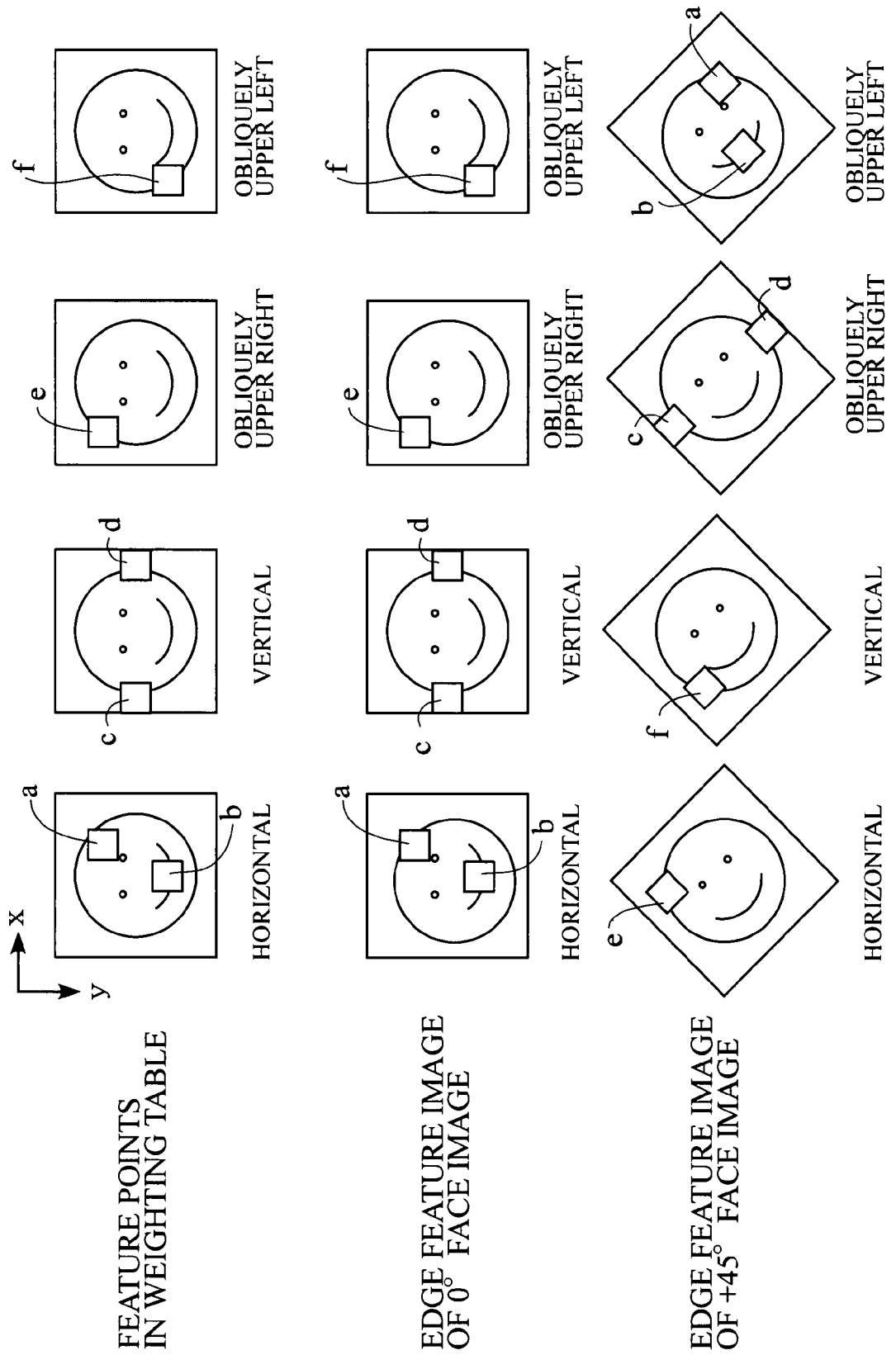
FIG. 23 is a schematic view showing a correspondence between the feature point (feature pixel) assigned by the weighting table and the feature point on the face image in the upright state and a correspondence between the feature point (feature pixel) assigned by the weighting table and the feature point on the face image rotated by +45°.

FIG. 23 shows a correspondence between the feature point (feature pixel) assigned by the weighting table and the feature point on the face image in the upright state and a correspondence between the feature point (feature pixel) assigned by the weighting table and the feature point on the face image rotated by +45°.

In the upper portion of FIG. 23, the feature point (indicated by q, y, and x) assigned in the weighting table is shown in each edge number (edge direction). In the middle portion of FIG. 23, the feature points are shown in the four-direction edge feature images corresponding to the upright face image. In the lower portion of FIG. 23, the feature points in the four-direction edge feature images corresponding to the face image which is rotated by +45°.

In the four-direction edge feature images corresponding to the face image which is rotated by +45°, the feature points a to f assigned in the weighting table emerge as shown in the lower portion of FIG. 23. That is, the feature points a and b corresponding to the horizontal edge direction assigned in the weighting table emerge in the obliquely upper left edge feature image in the edge feature images corresponding to the face image which is rotated by +45°. The feature points c and d corresponding to the vertical edge direction assigned in the weighting table emerge in the obliquely upper right edge feature image in the edge feature images corresponding to the face image which is rotated by +45°.

That is, the feature point e corresponding to the obliquely upper right edge direction assigned in the weighting table emerges in the horizontal edge feature image in the edge feature images corresponding to the face image which is rotated by +45°. The feature point f corresponding to the obliquely upper left edge direction assigned in the weighting table emerges in the vertical edge feature image in the edge feature images corresponding to the face image which is rotated by +45°.

Assuming that x and y are an xy coordinate of the feature point assigned in the weighting table while X and Y are an xy coordinate of the feature point in the edge feature image corresponding to the face image which is rotated by +45°, the relationship between the xy coordinates becomes the relationship between the point P and the point P1 of FIG. 24 in the corresponding feature points. Accordingly, a relational expression shown by the following equation (5) holds.

$$X=(Ty+x \cdot y)/\sqrt{2}$$

$$Y=(x+y)/\sqrt{2} \quad (5)$$

As shown in FIG. 24, Tx is a weight in the horizontal direction of the determination region and Ty is a weight in the vertical direction of the determination region.

A relationship shown in Table 2 holds between the position (q,y,x) of the feature point assigned in the weighting table and the position (Q,Y,X) of the corresponding feature point on the face image (edge feature image) which is rotated by +45°. Similarly a relationship shown in Table 2 holds between the position (q,y,x) of the feature point assigned in the weighting table and the position (Q,Y,X) of the corresponding feature point on the face image (edge feature image) which is rotated by −45°, +135° or −135°.

TABLE 2

|  | 0° (Default direction) | −45° | +45° | −135° | +135° |
|---|---|---|---|---|---|
| Correspondence of edge image (edge number q) | Vertical Horizontal Upper right Upper left | Upper left Upper right Vertical Horizontal | Upper right Upper left Horizontal Vertical | Upper right Upper left Horizontal Vertical | Upper left Upper right Vertical Horizontal |
| Correspondence of xy coordinate | X = x Y = y | X = (x + y)/√2 Y = (Ty − x + y)/√2 | X = (Ty + x − y)/√2 Y = (x + y)/√2 | X = (Ty − x + y)/√2 Y = (Ty + Tx − x − y)/√2 | X = (Ty + Tx − x − y)/√2 Y = (Tx + x − y)/√2 |

The relationship of the point P and the point P2 shown in FIG. 24 is obtained between the xy coordinate of the feature point assigned in the weighting table and the xy coordinate of the corresponding feature point on the face image (edge feature image) which is rotated by −45°. The relationship of the point P and the point P3 shown in FIG. 24 is obtained between the xy coordinate of the feature point assigned in the weighting table and the xy coordinate of the corresponding feature point on the face image (edge feature image) which is rotated by +135°. The relationship of the point P and a point P4 shown in FIG. 24 is obtained between the xy coordinate of the feature point assigned in the weighting table and the xy coordinate of the corresponding feature point on the face image (edge feature image) which is rotated by −135°.

Using the weighting table produced for the default rotational position, the face image in which the default face image is rotated by +45°, −45°, +135°, or −135° can be detected by utilizing the relationships in Table 2.

Specifically, for example, in the case where the face image which is rotated by +45° is detected, when the feature pixel F(n) is selected in Step S33 of FIG. 10, the selected feature pixel F(n) is converted into the corresponding feature pixel F'(n) on the face image (edge feature image) which is rotated by +45° based on the relationship of Table 2. In Step S34, the pixel value i(n) of the post-conversion feature pixel F'(n) is captured from the edge feature image. In Step S35, the weight w(n) corresponding to the pixel value i(n) of the feature pixel F(n) is obtained from the weighting table. The processes subsequent to Step S35 are similar to those of the first and second embodiments.

Fourth Embodiment

A fourth embodiment is improvement of the second embodiment described with reference to FIGS. 16 to 18.

The fourth embodiment differs from the second embodiment in contents of the face detecting process of Step S54 in Steps S51 to S56 of FIG. 16.

Figure 25:
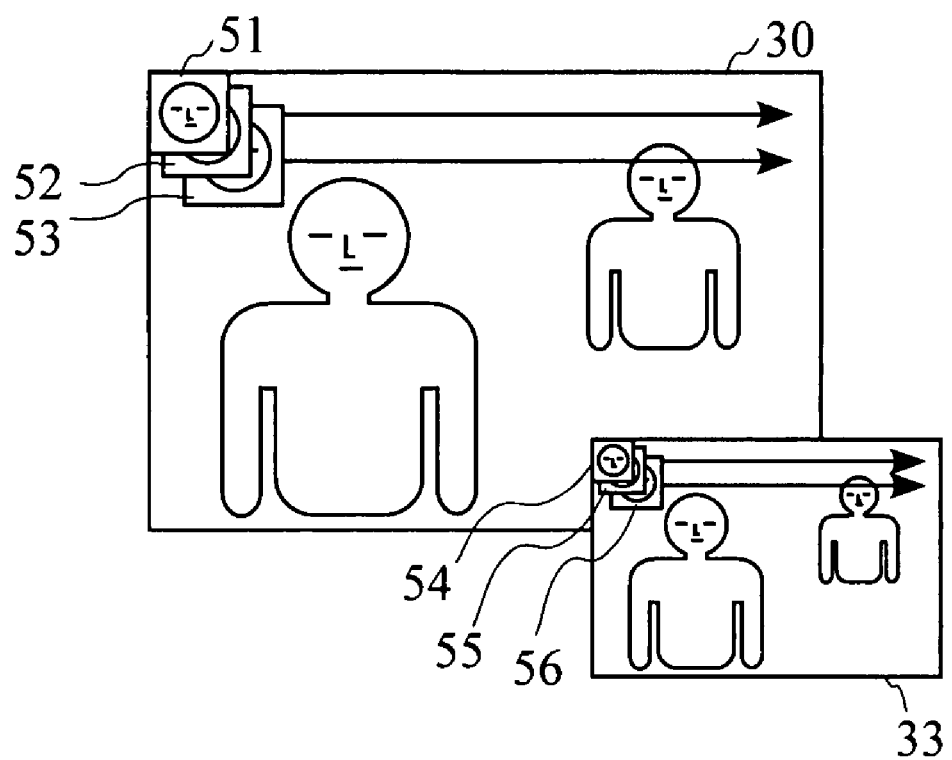
FIG. 25 is a schematic view showing two hierarchical images and a determination region used for each hierarchical image.

As described in the second embodiment, in the reduced-image generating process of Step S52, the reduced image 33 is generated from the input image 30 using a reduction ratio $R_M = R^3$ three times the reduction ratio R of the first embodiment as shown in FIG. 25. In the case where the reduction ratio R is set to 0.8, the reduction ratio $R_M$ becomes 0.512≅0.5. At this point, the image 33 having the smaller size is referred to as hierarchical image p and the image 30 having the larger size is referred to as hierarchical image p+1. In Step S53 (see FIG. 16), the edge feature image of each of the four directions is generated in each of the hierarchical images p+1 and p.

The face detecting process performed in Step S54 will be described below. In FIG. 25, determination regions 51, 52, and 53 having the different sizes are used for the hierarchical image p+1. As described in the second embodiment, the sizes of the determination regions 51, 52, and 53 are T1 by T1, T2 by T2, and T3 by T3 matrixes respectively.

In FIG. 25, determination regions 54, 55, and 56 having the different sizes are used for the hierarchical image p. Assuming that the sizes of the determination regions 54, 55, and 56 are Tp1 by Tp1, Tp2 by Tp2, and Tp3 by Tp3 matrixes respectively, Tp1, Tp2, and Tp3 are set to the sizes expressed by the following equation (6).

$$Tp1 = R^3 \times T1 \cong 0.5T1$$

$$Tp2 = R^3 \times T2 \cong 0.5T2$$

$$Tp3 = R^3 \times T3 \cong 0.5T3 \quad (6)$$

When the Tp1, Tp2, and Tp3 are set in the above-described manner, the face size which can be detected from the hierarchical image p+1 using the determination region 51 is equalized to the face size which can be detected from the hierarchical image p using the determination region 54. Similarly the face size which can be detected from the hierarchical image p+1 using the determination region 52 is equalized to the face size which can be detected from the hierarchical image p using the determination region 55. Similarly the face size which can be detected from the hierarchical image p+1 using the determination region 53 is equalized to the face size which can be detected from the hierarchical image p using the determination region 56.

The six kinds of the weighting tables are previously produced according to the six kinds of the determination regions 51 to 56 and stored in the memory.

In Step S54 (see FIG. 16), the face detecting process is performed in each of the hierarchical images p+1 and p. On the other hand, in the fourth embodiment, when the face detecting process is performed to the hierarchical image p+1 having the larger size, rough detection is performed as pre-processing using the lower-hierarchical image p having the number of pixels smaller than that of the hierarchical image p+1.

Figure 26:
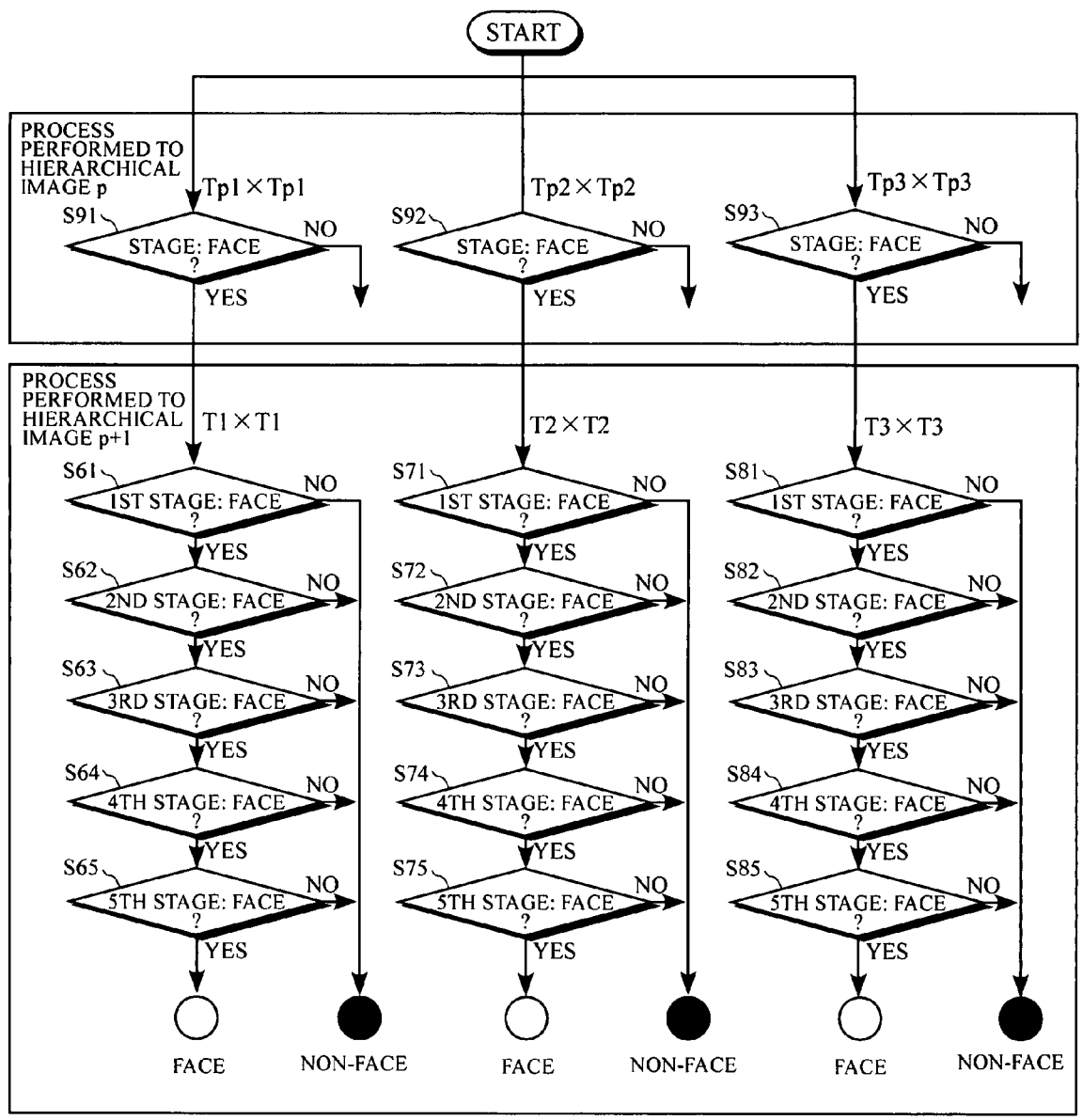
FIG. 26 is a flowchart showing the procedure of the face detecting process.

FIG. 26 shows the procedure of the face detecting process performed to the hierarchical image p+1.

The fourth embodiment differs from the second embodiment in that the rough detection is performed as the pre-processing using the hierarchical image p.

In Steps S61 to S65 of FIG. 26, the face detecting process is performed to the determination region 51 having the T1 by T1 matrix in the hierarchical image p+1. The face detecting process in Steps S61 to S65 of FIG. 26 is similar to that in Steps S61 to S65 of FIG. 18. In Steps S71 to S75 of FIG. 26, the face detecting process is performed to the determination region 52 having the T2 by T2 matrix in the hierarchical image p+1. The face detecting process in Steps S71 to S75 of FIG. 26 is similar to that in Steps S71 to S75 of FIG. 18. In Steps S81 to S85 of FIG. 26, the face detecting process is performed to the determination region 53 having the T3 by T3 matrix in the hierarchical image p+1. The face detecting process in Steps S81 to S85 of FIG. 26 is similar to that in Steps S81 to S85 of FIG. 18.

In Step S91, a roughly-detecting process is performed prior to Step S61. In Step S91, the face detecting process is performed to the determination region 54 having the Tp1 by Tp1 matrix in the hierarchical image p using the predetermined number of feature pixels Na. The procedure of the face detecting process in Step S91 is shown in FIG. 10. Only in the case where the face is detected in the roughly-detecting process, the flow goes to Step S61.

In Step S92, the roughly-detecting process is performed prior to Step S71. In Step S92, the face detecting process is performed to the determination region 55 having the Tp2 by Tp2 matrix in the hierarchical image p using the predetermined number of feature pixels Nb. The procedure of the face detecting process in Step S92 is shown in FIG. 10. Only in the case where the face is detected in the roughly-detecting process, the flow goes to Step S71.

In Step S93, the roughly-detecting process is performed prior to Step S81. In Step S93, the face detecting process is performed to the determination region 56 having the Tp3 by Tp3 matrix in the hierarchical image p using the predetermined number of feature pixels Nc. The procedure of the face detecting process in Step S93 is shown in FIG. 10. Only in the case where the face is detected in the roughly-detecting process, the flow goes to Step S81.

The face detecting process performed to the hierarchical image p is similar to that of the second embodiment although the fourth embodiment differs from the second embodiment in the size of the determination region.

According to the fourth embodiment, in the case where the face detecting process is performed to the hierarchical image p+1 having the larger size, the rough detection is performed as the pre-processing using the lower-hierarchical image p having the number of pixels smaller than that of the hierarchical image p+1. Therefore, in the case where the face is not detected in the rough detection, the processing speed is enhanced because the process performed to the hierarchical image p+1 can be neglected.

Fifth Embodiment

A fifth embodiment is improvement of the second embodiment described with reference to FIGS. 16 to 18.

The fifth embodiment differs from the second embodiment in contents of the face detecting process of Step S54 in Steps S51 to S56 of FIG. 16.

Figure 27:
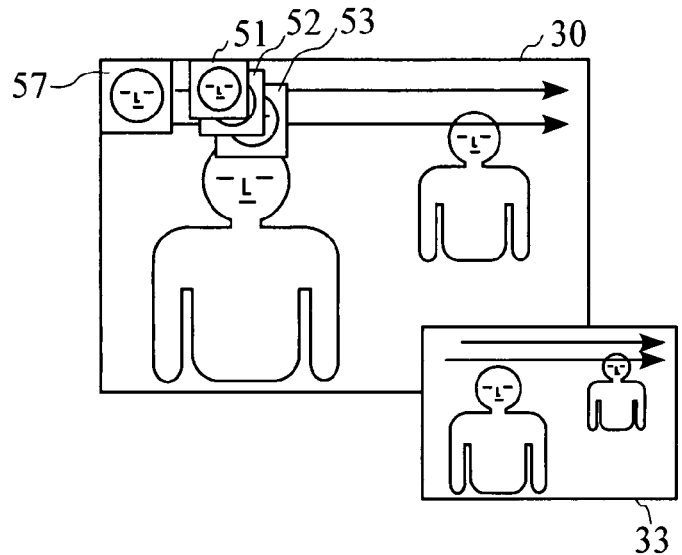
FIG. 27 is a schematic view showing two hierarchical images, a determination region, and a roughly-detecting determination region.

As described in the second embodiment, in the reduced-image generating process of Step S52, the reduced image 33 is generated from the input image 30 using a reduction ratio $R_M=R^3$ three times the reduction ratio R of the first embodiment as shown in FIG. 27. In the case where the reduction ratio R is set to 0.8, the reduction ratio $R_M$ becomes $0.512 \approx 0.5$. At this point, the image 33 having the smaller size is referred to as hierarchical image p and the image 30 having the larger size is referred to as hierarchical image p+1. In FIG. 27, the determination regions 51, 52, and 53 have the different sizes. As described in the second embodiment, the sizes of the determination regions 51, 52, and 53 are T1 by T1, T2 by T2, and T3 by T3 matrixes respectively.

In FIG. 27, the numeral 57 designates a roughly-detecting determination region. Assuming that Tc by Tc is the size of the roughly-detecting determination region, Tc=T3 is obtained. In Step S53 (see FIG. 16), the edge feature image of each of the four directions is generated in each of the hierarchical images p+1 and p.

The face detecting process performed in Step S54 (see FIG. 16) will be described below.

Figure 28:
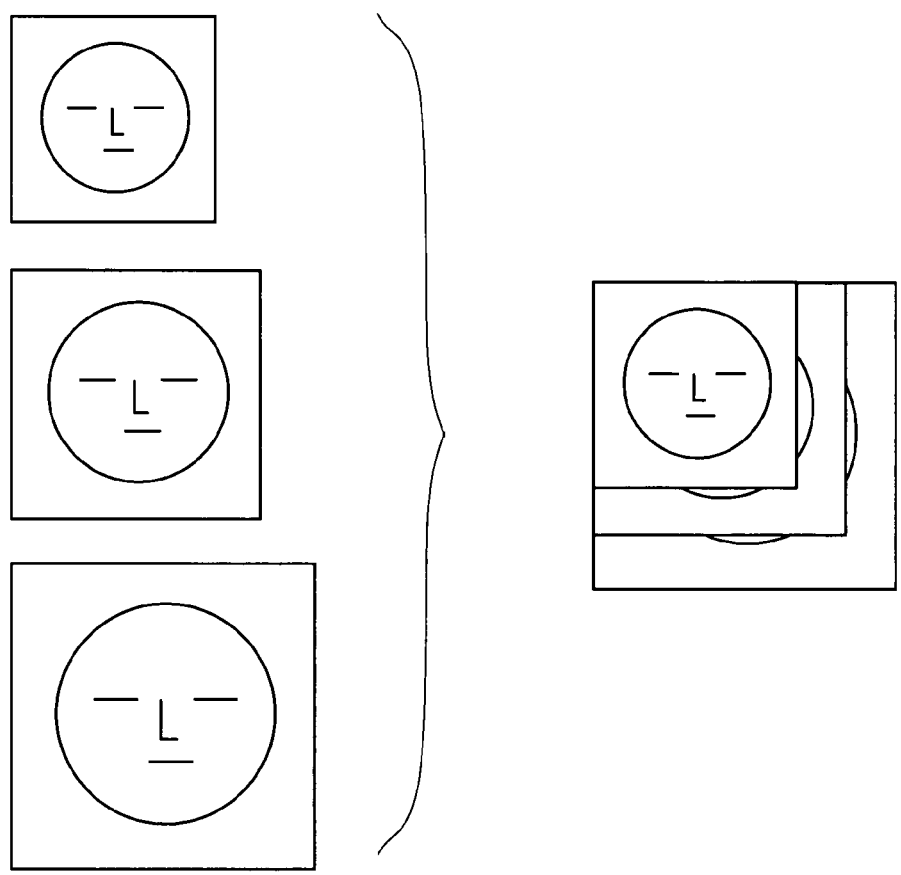
FIG. 28 is a schematic view conceptually explaining a method of generating a common weighting table.

In the fifth embodiment, as with the second embodiment, the three kinds of the weighting tables are also stored in the memory according to the size of the determination regions 51, 52, and 53. Additionally, in the fifth embodiment, a common weighting table used for the rough detection is previously produced and held. As shown in FIG. 28, the common weighting table is conceptually produced based on the image in which the three face images corresponding to the sizes of the determination regions 51, 52, and 53 are overlapped. That is, the common weighting table is produced based on the image including the three face images having the different sizes. Accordingly, in the case where the face detection is performed using the common weighting table, it can roughly be detected whether or not one of the three face images having the different sizes exists.

In Step S54 (see FIG. 16), the face detecting process is performed in each of the hierarchical images p+1 and p. On the other hand, in the fifth embodiment, when the face detecting process is performed to each of the hierarchical images p+1 and p, the rough detection is performed as the pre-processing using the common weighting table.

Figure 29:
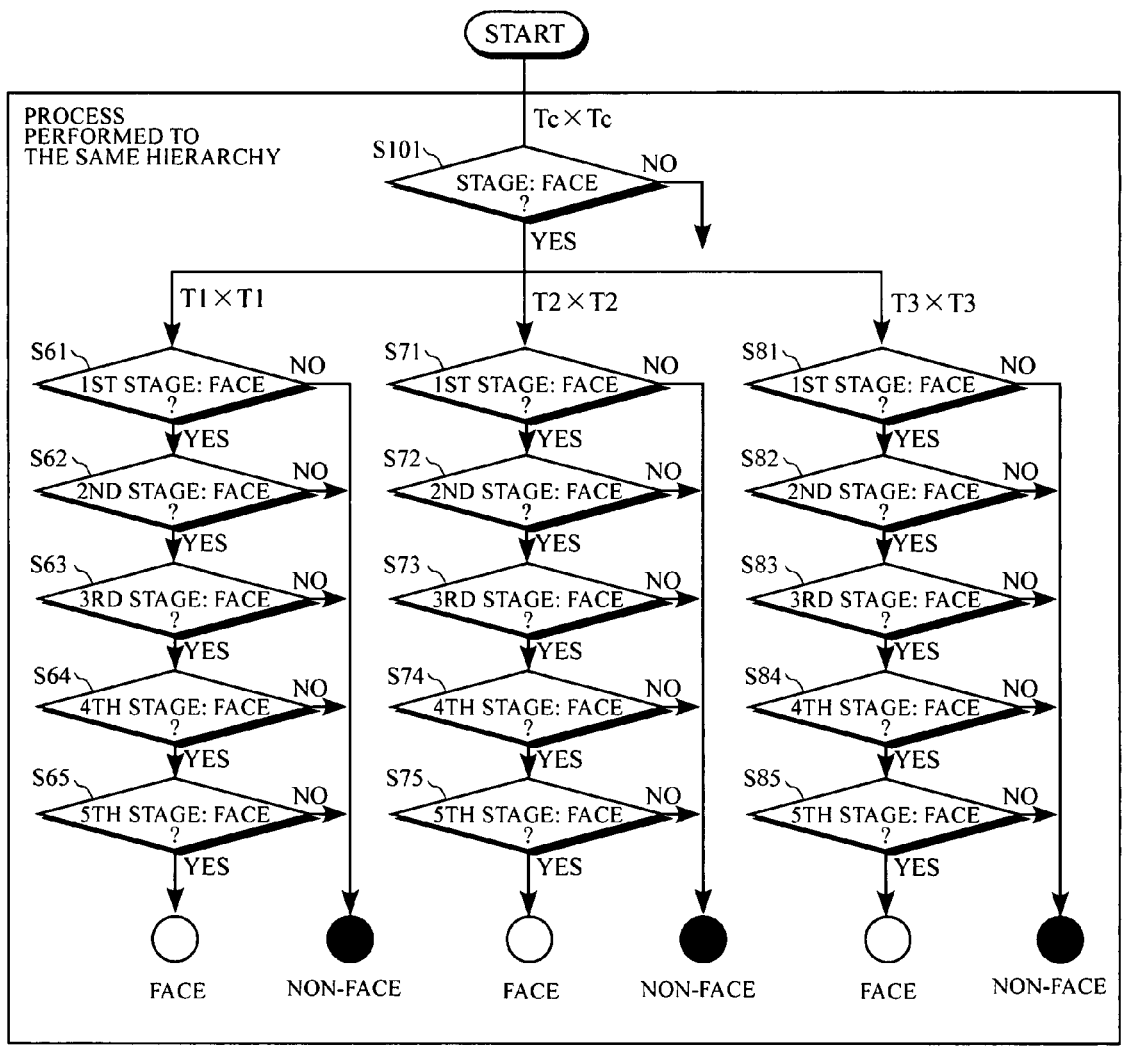
FIG. 29 is a flowchart showing the procedure of the face detecting process performed to a hierarchical image.

FIG. 29 shows the procedure of the face detecting process performed to a certain hierarchical image.

In Steps S61 to S65 of FIG. 29, the face detecting process is performed to the determination region 51 having the T1 by T1 matrix in the hierarchical image. The face detecting process in Steps S61 to S65 of FIG. 29 is similar to that in Steps S61 to S65 of FIG. 18. In Steps S71 to S75 of FIG. 29, the face detecting process is performed to the determination region 52 having the T2 by T2 matrix in the hierarchical image. The face detecting process in Steps S71 to S75 of FIG. 29 is similar to that in Steps S71 to S75 of FIG. 18. In Steps S81 to S85 of FIG. 29, the face detecting process is performed to the determination region 53 having the T3 by T3 matrix in the hierarchical image. The face detecting process in Steps S81 to S85 of FIG. 29 is similar to that in Steps S81 to S85 of FIG. 18.

In the face detecting process, the rough detection is performed to the determination region 57 having the Tc by Tc matrix in the hierarchical image using the common weighting table (Step S101). The feature pixels used in Step S101 are previously obtained. When the face is not detected in the rough detection, it is determined that the face does not exist in the determination region, and the usual determination process is neglected for the determination region. The processes (processes from. Step S61, processes from Step S71, and processes from Step S81) similar to those of the second embodiment are performed only in the case where the face is detected in the rough detection.

According to the fifth embodiment, in the case where the face detecting process is performed to the hierarchical image, the rough detection is performed as the pre-processing using the common weighting table. Therefore, in the case where the face is not detected in the rough detection, the processing speed is enhanced because the usual determination process can be neglected.

Sixth Embodiment

A sixth embodiment is improvement of the second embodiment described with reference to FIGS. 16 to 18.

The sixth embodiment differs from the second embodiment in contents of the face detecting process of Step S54 in Steps S51 to S56 of FIG. 16.

Figure 30:
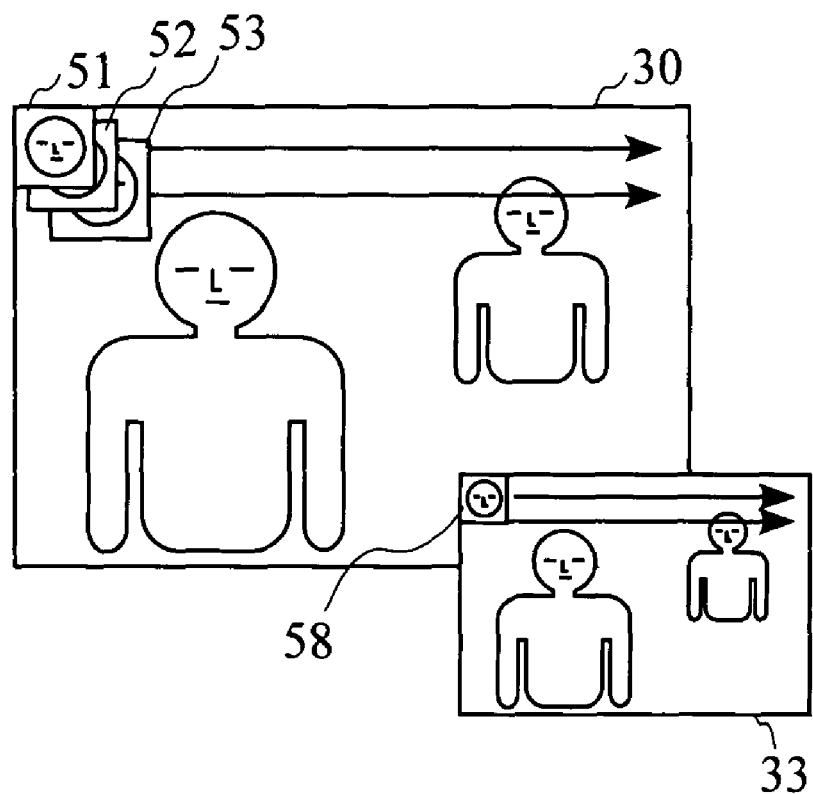
FIG. 30 is a schematic view showing two hierarchical images, a determination region, and a roughly-detecting determination region.

As described in the second embodiment, in the reduced-image generating process of Step S52, the reduced image 33 is generated from the input image 30 using a reduction ratio $R_M = R^3$ three times the reduction ratio R of the first embodiment as shown in FIG. 30. In the case where the reduction ratio R is set to 0.8, the reduction ratio $R_M$ becomes $0.512 \approx 0.5$. At this point, the image 33 having the smaller size is referred to as hierarchical image p and the image 30 having the larger size is referred to as hierarchical image p+1. In Step S53 (see FIG. 16), the edge feature image of each of the four directions is generated in each of the hierarchical images p+1 and p.

The face detecting process performed in Step S54 (see FIG. 16) will be described below.

In FIG. 30, the determination regions 51, 52, and 53 have the different sizes. As described in the second embodiment, the sizes of the determination regions 51, 52, and 53 are T1 by T1, T2 by T2, and T3 by T3 matrixes respectively. In FIG. 30, the numeral 58 designates a determination region used in the rough detection. The rough detection is performed using the hierarchical image p lower than the hierarchical image p+1.

Assuming that Tpc by Tpc is the size of the determination region 58, Tpc is set in the size expressed by the following equation (7).

$$Tpc = R^3 \times T3 \approx 0.5 T3 \qquad (7)$$

In the sixth embodiment, as with the second embodiment, the three kinds of the weighting tables are also stored in the memory according to the size of the determination regions 51, 52, and 53. Additionally, in the sixth embodiment, a common weighting table used for the rough detection corresponding to the determination region 58 on the hierarchical image p is previously produced and held. The common weighting table is produced as described in the fifth embodiment. Accordingly, in the case where the face detection is performed using the common weighting table, it can roughly be detected whether or not one of the three face images having the different sizes exists.

In Step S54 (see FIG. 16), the face detecting process is performed in each of the hierarchical images p+1 and p. On the other hand, in the sixth embodiment, when the face detecting process is performed to the hierarchical images p+1 having the larger size, the rough detection is performed as the pre-processing using the lower-hierarchical image p having the number of pixels smaller than that of the hierarchical image p+1.

Figure 31:
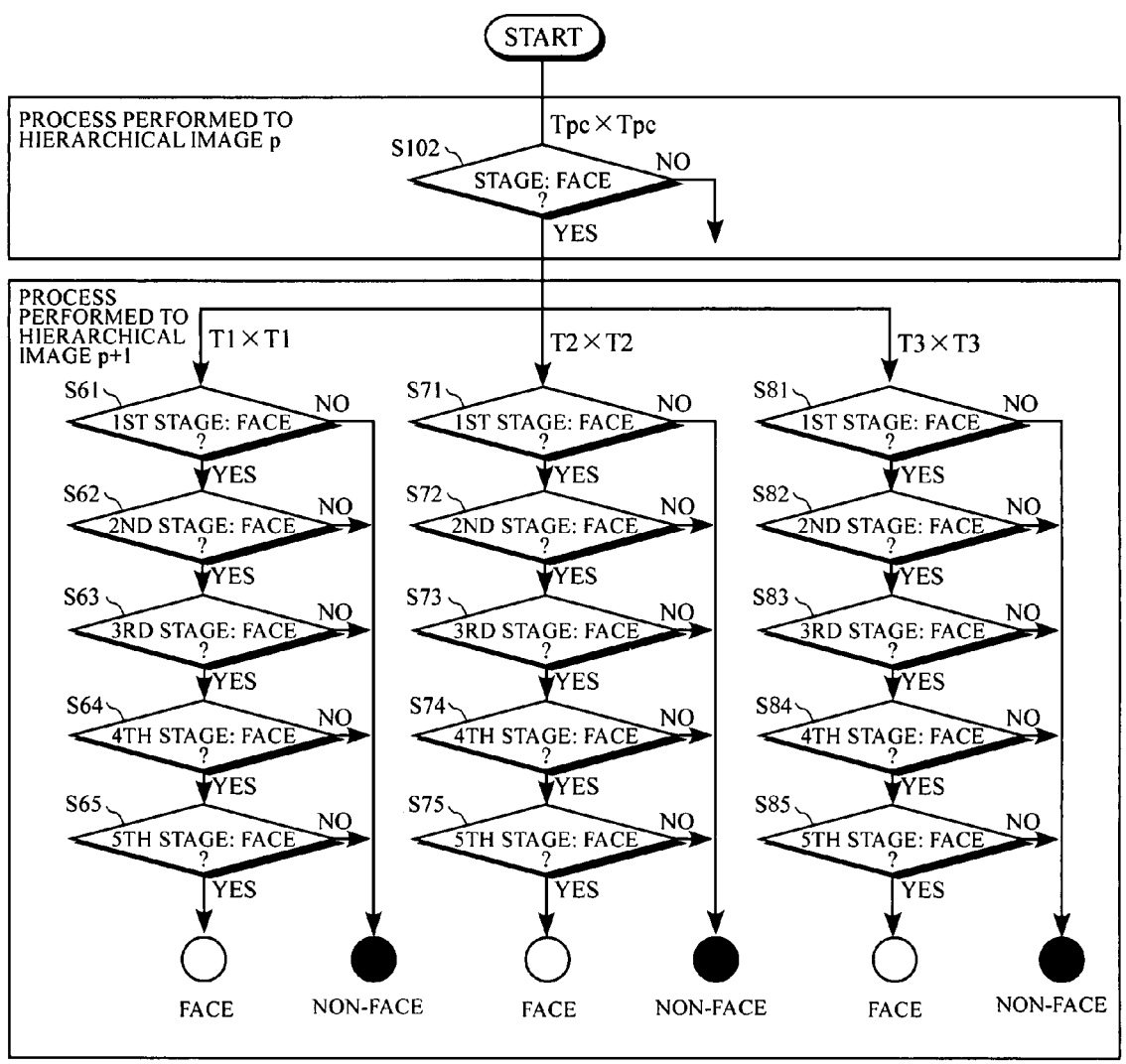
FIG. 31 is a flowchart showing the procedure of the face detecting process.

FIG. 31 shows the procedure of the face detecting process performed to the hierarchical image p+1.

In Steps S61 to S65 of FIG. 31, the face detecting process is performed to the determination region 51 having the T1 by T1 matrix in the hierarchical image p+1. The face detecting process in Steps S61 to S65 of FIG. 31 is similar to that in Steps S61 to S65 of FIG. 18. In Steps S71 to S75 of FIG. 31, the face detecting process is performed to the determination region 52 having the T2 by T2 matrix in the hierarchical image p+1. The face detecting process in Steps S71 to S75 of FIG. 31 is similar to that in Steps S71 to S75 of FIG. 18. In Steps S81 to S85 of FIG. 31, the face detecting process is performed to the determination region 53 having the T3 by T3 matrix in the hierarchical image p+1. The face detecting process in Steps S81 to S85 of FIG. 31 is similar to that in Steps S81 to S85 of FIG. 18.

In the face detecting process, the rough detection is performed to the determination region 58 having the Tpc by Tpc matrix in the hierarchical image p using the common weighting table (Step S102). The feature pixels used in Step S102 are previously obtained. When the face is not detected in the rough detection, it is determined that the face does not exist in the determination region, and the usual determination process is neglected for the determination region. The processes (processes from Step S61, processes from Step S71, and processes from Step S81) similar to those of the second embodiment are performed only in the case where the face is detected in the rough detection.

As with the second embodiment, the roughly-detecting process is performed to the hierarchical image p. According to the sixth embodiment, in the case where the face detecting process is performed to the hierarchical image p+1 having the larger size, the rough detection is performed as the pre-processing to the lower-hierarchical image p having the number of pixels smaller than that of the hierarchical image p+1 using the common weighting table. Therefore, in the case where the face is not detected in the rough detection, the processing speed is enhanced because the usual determination process can be neglected for the hierarchical image p+1.

Seventh Embodiment

A seventh embodiment is improvement of the second embodiment described with reference to FIGS. 16 to 18.

The seventh embodiment differs from the second embodiment in contents of the face detecting process of Step S54 in Steps S51 to S56 of FIG. 16.

Figure 32:
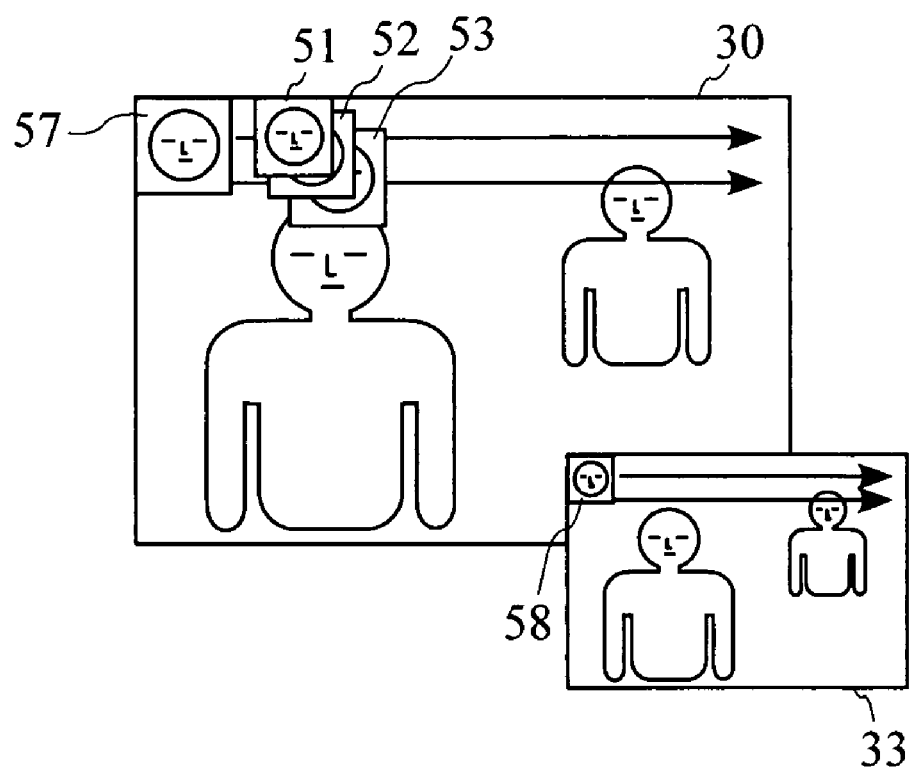
FIG. 32 is a schematic view showing two hierarchical images, a determination region, and roughly-detecting determination region.

As described in the second embodiment, in the reduced-image generating process of Step S52, the reduced image 33 is generated from the input image 30 using a reduction ratio $R_M = R^3$ three times the reduction ratio R of the first embodiment as shown in FIG. 32. In the case where the reduction ratio R is set to 0.8, the reduction ratio $R_M$ becomes $0.512 \approx 0.5$. At this point, the image 33 having the smaller size is referred to as hierarchical image p and the image 30 having the larger size is referred to as hierarchical image p+1.

In FIG. 32, the determination regions 51, 52, and 53 have the different sizes. As described in the second embodiment, the sizes of the determination regions 51, 52, and 53 are T1 by T1, T2 by T2, and T3 by T3 matrixes respectively. In FIG. 32, as described in the fifth embodiment, the numeral 57 designates the roughly-detecting determination region used for the hierarchical image p+1 (hereinafter referred to as second roughly-detecting determination region). Assuming that Tc by Tc is the size of the second roughly-detecting determination region, Tc=T3 is obtained. Second rough detection is performed to the hierarchical image p+1 using the second roughly-detecting determination region 57.

In FIG. 32, as described in the sixth embodiment, the numeral 58 designates a roughly-detecting determination region (hereinafter referred to as first roughly detecting determination region) used for the hierarchical image p. First rough detection is performed to the hierarchical image p lower than the hierarchical image p+1 using the first roughly detecting determination region 58.

Assuming that Tpc by Tpc is the size of the determination region 58, Tpc is set in the size expressed by the following equation (8).

$$Tpc = R^3 \times T3 \approx 0.5 T3 \tag{8}$$

In Step S53 (see FIG. 16), the edge feature image of each of the four directions is generated in each of the hierarchical images p+1 and p.

The detection process performed in Step S54 (see FIG. 16) will be described below.

In the seventh embodiment, as with the second embodiment, the three kinds of the weighting tables are also stored in the memory according to the size of the determination regions 51, 52, and 53. Additionally, in the seventh embodiment, not only a second common weighting table corresponding to the second roughly-detecting determination region 57 is previously produced and held, but also a first common weighting table corresponding to the first roughly detecting determination region 58 is previously produced and held. These common weighting tables are generated as described in the fifth embodiment.

In Step S54 (see FIG. 16), the face detecting process is performed in each of the hierarchical images p+1 and p. On the other hand, in the seventh embodiment, when the face detecting process is performed to the hierarchical image p+1 having the larger size, the first roughly-detecting process is performed as the pre-processing to the hierarchical image p having the number of overall pixels smaller than the hierarchical image p+1, and the second roughly-detecting process is performed to the hierarchical image p+1.

Figure 33:
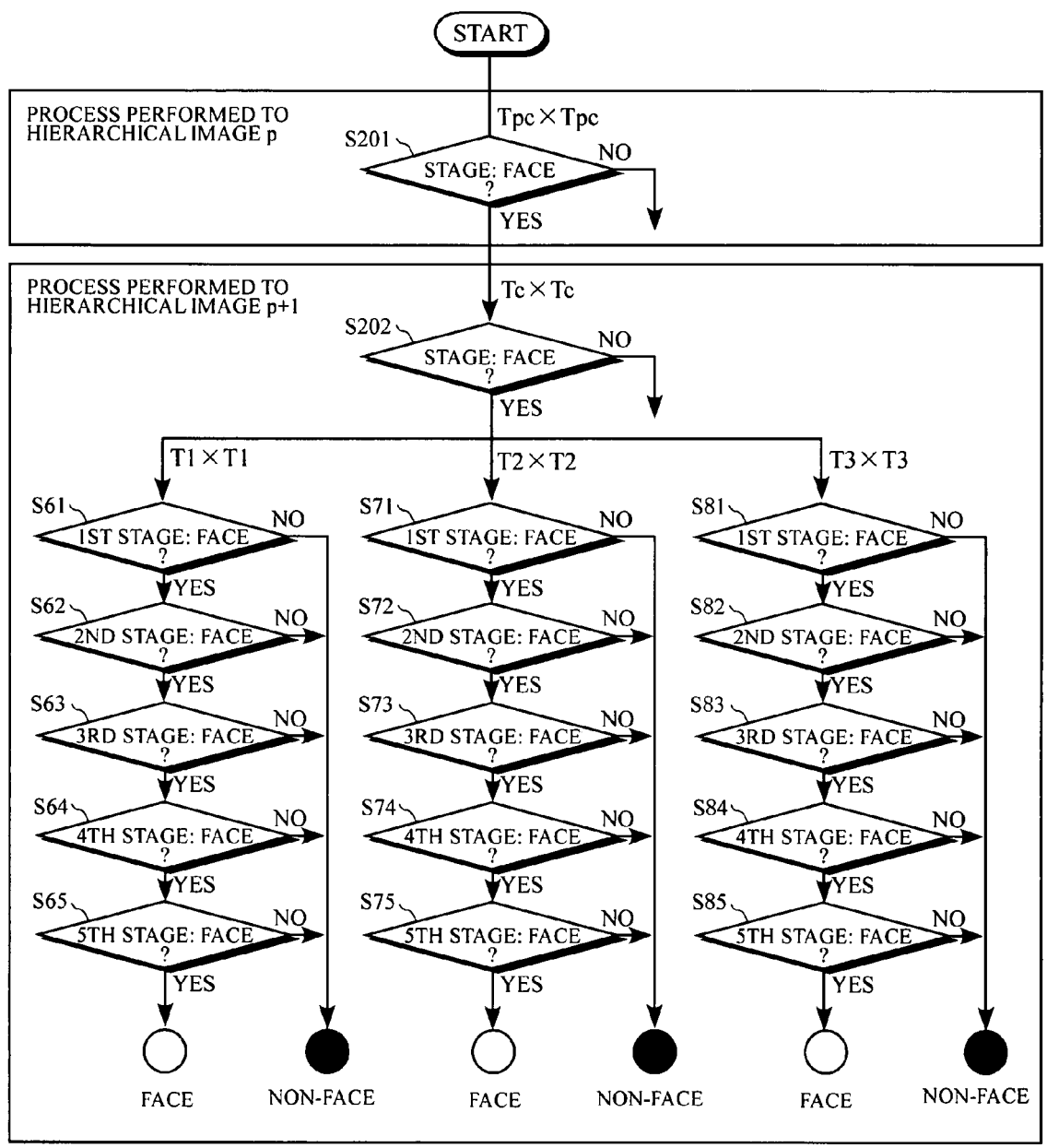
FIG. 33 is a flowchart showing the procedure of the face detecting process.

FIG. 33 is a flowchart showing the procedure of the face detecting process performed to the hierarchical image p+1.

In Steps S61 to S65 of FIG. 33, the face detecting process is performed to the determination region 51 having the T1 by T1 matrix in the hierarchical image p+1. The face detecting process in Steps S61 to S65 of FIG. 33 is similar to that in Steps S61 to S65 of FIG. 18. In Steps S71 to S75 of FIG. 33, the face detecting process is performed to the determination region 52 having the T2 by T2 matrix in the hierarchical image p+1. The face detecting process in Steps S71 to S75 of FIG. 33 is similar to that in Steps S71 to S75 of FIG. 18. In Steps S81 to S85 of FIG. 33, the face detecting process is performed to the determination region 53 having the T3 by T3 matrix in the hierarchical image p+1. The face detecting process in Steps S81 to S85 of FIG. 33 is similar to that in Steps S81 to S85 of FIG. 18.

In the face detecting process, the first rough detection is performed to the first roughly detecting determination region 58 having the Tpc by Tpc matrix in the hierarchical image p using the first roughly-detecting common weighting table (Step S201). The feature pixels used in Step S201 are previously obtained. When the face is not detected in the first rough detection, it is determined that the face does not exist in the determination region, and the usual determination process is neglected for the determination region.

When the face is detected in the first rough detection, the second rough detection is performed to the second roughly detecting determination region 57 having the Tc by Tc matrix in the hierarchical image p+1 using the second roughly-detecting common weighting table (Step S202). The feature pixels used in Step S202 are previously obtained. When the face is not detected in the second rough detection, it is determined that the face does not exist in the determination region, and the usual determination process is neglected for the determination region. The processes (processes from Step S61, processes from Step S71, and processes from Step S81) similar to those of the second embodiment are performed only in the case where the face is detected in the second rough detection.

As with the second embodiment, the face detecting process is performed to the hierarchical image p. According to the seventh embodiment, in the case where the face detecting process is performed to the hierarchical image p+1 having the larger size, the first rough detection is performed as the pre-processing to the lower-hierarchical image p having the number of pixels smaller than that of the hierarchical image p+1 using the common weighting table, and the second rough detection is performed to the hierarchical image p+1 using the second common weighting table. Therefore, in the case where the face is not detected in the rough detection, the processing speed is enhanced because the usual determination process can be neglected for the hierarchical image p+1.

Eighth Embodiment

In the above embodiments, for convenience of explanation, the face is detected using the weighting table (or coefficient table) for the frontal face.

In order to enhance the face detection accuracy, a first face detecting process performed using a weighting table (or coefficient table) for the frontal face, a second face detecting process performed using a weighting table (or coefficient table) for the profile face, and a third face detecting process performed using a weighting table (or coefficient table) for the oblique face are separately performed, and it is determined that the face exists when the face is detected in one of the face detecting processes.

As shown in FIG. 9, because each of the first face detecting process, the second face detecting process, and the third face detecting process includes multi-stage determination step, it takes a long time to process all the determination steps. Therefore, in an eighth embodiment, the processing time is shortened.

FIG. 34 shows the procedure of the face detecting process.

For convenience of explanation, it is assumed that the first face detecting process performed using the weighting table (or coefficient table) for the frontal face includes two-stage determination step (Step S301 and Step S302). The first-stage determination step (Step S301) differs from the second-stage determination step (Step S302) in the number of feature pixels used in the determination. That is, the number of feature pixels used in the second-stage determination step (Step S302) is larger than the number of feature pixels used in the first-stage determination step (Step S301).

Similarly, it is assumed that the second face detecting process performed using the weighting table (or coefficient table) for the profile face includes two-stage determination step (Step S401 and Step S402), and it is assumed that the third face detecting process performed using the weighting table (or coefficient table) for the frontal face includes two-stage determination step (Step S501 and Step S502).

The first-stage determination step (Step S301) of the first face detecting process, the first-stage determination step (Step S401) of the second face detecting process, and the first-stage determination step (Step S501) of the third face detecting process are performed.

When the face is not detected in all Steps S301, S401, and S501, it is determined that the face does not exist. When the face is detected in one of Steps S301, S401, and S501, the flow goes to Step S600.

In Step S600, on the basis of the score S computed in one of Steps S301, S401, and S501 in which the face is detected, it is determined which process should be continued. That is, in the score S computed in the first-stage determination step in which the face is detected, the kind of the face detecting process (first to third face detecting processes) corresponding to the determination step having the largest score S is specified. Then, in the specified face detecting process, the flow goes to the second-stage determination step.

For example, in the case where the faces are detected in all Steps S361, S401, and S501, when the score S computed in Step S301 has the largest one in the scores S computed in Steps S301, S401, and S501, the flow goes to Step S302 which is of the second-stage determination step of the first face detecting process. In this case, the second-stage determination steps are not performed in the second and third face detecting processes.

What is claimed is:

1. An object detection apparatus which detects a specific object in an input image, the object detection apparatus comprising:
   a specific object detecting module performing a specific object detection process of:
      with a processor:
         setting the input image or a reduced image of the input image as a target image, and generating an edge feature image of the target image,
         determining whether the specific object exists in a determination region while scanning the determination region in the edge feature image of the target image,
      wherein the specific object detecting module includes a determination module for determining whether the specific object exists in the determination region based on an edge feature amount of the edge feature image corresponding to the determination region and a previously determined relationship between an edge feature amount and a weight indicating object likelihood for each predetermined feature pixel in an image having the same size as the determination region,
      wherein the specific object detecting module includes a specific object detecting table stored in a memory, the specific object detecting table previously prepared from a plurality of sample images, including the specific object, and storing a previously determined relationship between an edge feature amount and a weight indicating object likelihood for each predetermined feature pixel in the image having the same size as the determination region; and the determination module determining whether the specific object exists in the determination region based on the edge feature amount of the edge feature image corresponding to the determination region and the specific object detecting table,
      wherein the specific object detection module prepares a plurality of kinds of determination regions having different sizes, the specific object detection module holding a plurality of specific object detecting tables according to a plurality of kinds of determination regions, the specific object detection module setting the plurality of kinds of the determination regions in the edge feature image of the target image, and the specific object detection module performing the specific object detecting process in each set determination region using a specific object detecting table corresponding to the determination region.

2. The object detection apparatus according to claim 1, wherein the specific object detection module prepares the plurality of kinds of the determination regions having the different sizes, the specific object detection module holds the plurality of specific object detecting tables according to the plurality of kinds of the determination regions and a specific object roughly-detecting table for detecting faces having all the sizes, the face being able to be detected by each determination region, the specific object detection module sets a common determination region including all the kinds of the determination regions in the edge feature image of the target image, the specific object detection means performs the specific object roughly-detecting process using the specific object roughly-detecting table, and the specific object detection module sets the plurality of kinds of the determination regions in the edge feature image of the target image and performs the specific object detecting process in each set determination region using the specific object detecting table corresponding to the determination region when a face is detected in the specific object roughly-detecting process.

3. The object detection apparatus according to claim 1, wherein the edge feature image is an edge feature image corresponding to each of the four directions of a horizontal direction, a vertical direction, an obliquely upper right direction, and an obliquely upper left direction, the feature pixel of the specific object detecting table is expressed by an edge number indicating an edge direction and an xy coordinate, a position in which the edge number of the feature pixel and/or the xy coordinate is converted by a predetermined rule is used as a position on the edge feature image corresponding to any feature pixel of the specific object detecting table, and the specific object which is rotated by a predetermined angle with respect to a default rotation angle position of the specific object can be detected by the post-conversion position.

4. The object detection apparatus according to claim 1, wherein the edge feature image is an edge feature image corresponding to each of the four directions of a horizontal direction, a vertical direction, an obliquely upper right direction, and an obliquely upper left direction, the feature pixel of the specific object detecting table is expressed by an edge number indicating an edge direction and an xy coordinate, a position in which the edge number of the feature pixel and/or the xy coordinate is converted by a predetermined rule is used as a position on the edge feature image corresponding to any feature pixel of the specific object detecting table, and the specific object in which a default attitude is horizontally flipped or the specific object in which a default attitude is vertically flipped can be detected by the post-conversion position.

5. An object detection apparatus which detects a specific object in an input image, the object detection apparatus comprising:
   a reduced-image generating module, which with a processor, generates one or a plurality of reduced images from the input image; and
   a specific object detection module, which with a processor, performs a specific object detecting process of setting each of a plurality of hierarchical images as a target image, and determines whether the specific object exists in a determination region while scanning the determination region in an edge feature image of the target image, the plurality of hierarchical images including the input image and one or a plurality of reduced images of the input image, wherein the specific object detection module includes a determination module for determining whether the specific object exists in the determination region, based on an edge feature amount of the edge feature image corresponding to the determination region, and a previously determined relationship between an edge feature amount and a weight indicating object likelihood for each predetermined feature pixel in an image having the same size as the determination region, wherein the specific object detection module prepares a plurality of kinds of the determination regions having different sizes, the specific object detection module storing in a memory a plurality of specific object detecting tables according to the plurality of kinds of the determination regions, the specific object detection module setting the plurality of kinds of the determination regions in the edge feature image of the target image, and the specific object detection module performing the specific object detecting process in each set determination region using the specific object detecting table corresponding to the determination region.

6. The object detection apparatus according to claim 5, wherein the specific object detection module prepares the determination region having the different size in each hierarchical target image, the specific object detection module holds the plurality of specific object detecting tables according to the determination regions, the specific object detection module performs a specific object roughly-detecting process to a lower hierarchical edge feature image of a lower hierarchical target image using the determination region corresponding to the lower hierarchy and the specific object detecting table corresponding to the determination region of the lower hierarchy when the specific object detection module performs the specific object detecting process to an arbitrary hierarchy, and the specific object detection module performs the specific object detecting process to the hierarchical edge feature image of the hierarchical target image using the determination region corresponding to the arbitrary hierarchy and the specific object detecting table corresponding to the determination region of the arbitrary hierarchy when a face is detected in the specific object roughly-detecting process.

7. The object detection apparatus according to claim 5, wherein the specific object detection module prepares a plurality of kinds of the determination regions having the different sizes, the specific object detection module holds the plurality of specific object detecting tables according to the plurality of kinds of the determination regions and a specific object roughly-detecting table for detecting faces having all the sizes, the face being able to be detected by each determination region, the specific object detection means sets a common determination region including all the kinds of the determination regions in the edge feature image of the target image, the specific object detection module performs the specific object roughly-detecting process using the specific object roughly-detecting table, and the specific object detection module sets the plurality of kinds of the determination regions in the edge feature image of the target image and performs the specific object detecting process in each set determination region using the specific object detecting table corresponding to the determination region when a face is detected in the specific object roughly-detecting process.

8. The object detection apparatus according to claim 5, wherein the edge feature image is an edge feature image corresponding to each of the four directions of a horizontal direction, a vertical direction, an obliquely upper right direction, and an obliquely upper left direction, the feature pixel of the specific object detecting table is expressed by an edge number indicating an edge direction and an xy coordinate, a position in which the edge number of the feature pixel and/or the xy coordinate is converted by a predetermined rule is used as a position on the edge feature image corresponding to any feature pixel of the specific object detecting table, and the specific object which is rotated by a predetermined angle with respect to a default rotation angle position of the specific object can be detected by the post-conversion position.

9. The object detection apparatus according to claim 5, wherein the edge feature image is an edge feature image corresponding to each of the four directions of a horizontal direction, a vertical direction, an obliquely upper right direction, and an obliquely upper left direction, the feature pixel of the specific object detecting table is expressed by an edge number indicating an edge direction and an xy coordinate, a position in which the edge number of the feature pixel and/or the xy coordinate is converted by a predetermined rule is used as a position on the edge feature image corresponding to any feature pixel of the specific object detecting table, and the specific object in which a default attitude is horizontally flipped or the specific object in which a default attitude is vertically flipped can be detected by the post-conversion position.

* * * * *